US010949055B2

(12) United States Patent
Torii et al.

(10) Patent No.: US 10,949,055 B2
(45) Date of Patent: Mar. 16, 2021

(54) DISPLAY SYSTEM, DISPLAY APPARATUS, CONTROL METHOD FOR DISPLAY APPARATUS

(71) Applicant: SEIKO EPSON CORPORATION, Tokyo (JP)

(72) Inventors: Shinya Torii, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 60 days.

(21) Appl. No.: 15/830,749

(22) Filed: Dec. 4, 2017

(65) Prior Publication Data
US 2018/0164983 A1 Jun. 14, 2018

(30) Foreign Application Priority Data

Dec. 14, 2016 (JP) .............................. JP2016-241832

(51) Int. Cl.
*G06F 3/0481* (2013.01)
*G02B 27/01* (2006.01)
(Continued)

(52) U.S. Cl.
CPC ....... *G06F 3/04815* (2013.01); *G02B 27/017* (2013.01); *G02B 27/0172* (2013.01); *G06F 1/1694* (2013.01); *G06F 1/3206* (2013.01); *G06F 1/3287* (2013.01); *G06F 3/011* (2013.01); *G06F 3/012* (2013.01); *G06F 3/14* (2013.01); *G06F 3/167* (2013.01); *G09G 5/00* (2013.01); *G09G 5/08* (2013.01); *G09G 5/36* (2013.01); *G09G 5/377* (2013.01);
(Continued)

(58) Field of Classification Search
None
See application file for complete search history.

(56) References Cited

U.S. PATENT DOCUMENTS

2002/0069072 A1* 6/2002 Friedrich ............. G05B 19/409
704/275
2003/0184602 A1 10/2003 Kuroki et al.
(Continued)

FOREIGN PATENT DOCUMENTS

JP 2003-296757 A 10/2003

*Primary Examiner* — Christopher R Lamb
(74) *Attorney, Agent, or Firm* — Oliff PLC

(57) ABSTRACT

A guidance system includes first and second HMDs. The first HMD includes a first image display section, and a reception section receiving an instruction, and a first control section generating output information in response to an instruction received by the reception section and transmitting the output information to the second HMD. The second HMD includes a second image display section displaying an image to be visually recognized in an overlapping manner with external scenery, a second storage section storing AR content including an AR image combined with external scenery visually recognized in the second display section, and a second control section displaying an image based on at least one of the AR content stored in the second storage section and the output information on the second display section according to a position of the second HMD or a visual field of external scenery visually recognized in the second display section.

16 Claims, 14 Drawing Sheets

(51) Int. Cl.
    *G09G 5/08*          (2006.01)
    *G06F 3/14*          (2006.01)
    *G06F 1/16*          (2006.01)
    *G06F 1/3206*        (2019.01)
    *G06F 1/3287*        (2019.01)
    *G09G 5/00*          (2006.01)
    *G09G 5/377*         (2006.01)
    *G09G 5/36*          (2006.01)
    *G06F 3/01*          (2006.01)
    *G06F 3/16*          (2006.01)

(52) U.S. Cl.
    CPC .................. *G02B 2027/014* (2013.01); *G02B 2027/0138* (2013.01); *G02B 2027/0141* (2013.01); *G02B 2027/0187* (2013.01); *G06F 2200/1637* (2013.01); *Y02D 10/00* (2018.01)

(56) References Cited

U.S. PATENT DOCUMENTS

| | | | | |
|---|---|---|---|---|
| 2013/0083011 A1* | 4/2013 | Geisner | .................... | G09G 5/00 345/419 |
| 2013/0201214 A1* | 8/2013 | Piippo | ....................... | G06F 3/14 345/633 |
| 2013/0307874 A1* | 11/2013 | Blanchflower | ......... | H04L 67/38 345/633 |
| 2016/0033770 A1* | 2/2016 | Fujimaki | ............... | G06T 19/006 345/8 |
| 2016/0371885 A1* | 12/2016 | Gavriliuc | .............. | G06T 19/006 |

\* cited by examiner

DISPLAY SYSTEM, DISPLAY APPARATUS, CONTROL METHOD FOR DISPLAY APPARATUS

BACKGROUND

1. Technical Field

The present invention relates to a display system, a display apparatus, and a control method for a display apparatus.

2. Related Art

In the related art, there is a method in which a VR application or an MR application for designating a virtual sphere present in a virtual three-dimensional space is executed, a designated direction in a designated coordinate system is obtained in response to an instruction of an operator, and a designation image is generated (for example, refer to JP-A-2003-296757). According to the method disclosed in JP-A-2003-296757, it is possible to generate a designation image for designating a position in a three-dimensional space.

According to the method disclosed in JP-A-2003-296757, a designation image as intended by a user designating a position can be generated, but, in a case where the designation image is viewed by another user, the designation image may be viewed in a state which is different from the user's intention depending on a position or a direction of another user viewing the designation image. For example, in a case where an AR application is executed, it is important to overlap the designation image with scenery (so-called external scenery) of the real space, but it is not easy to match a state in which the designation image overlaps external scenery with the user's intention on an indication image generation side.

SUMMARY

An advantage of some aspects of the invention is to appropriately show another user a designated position as intended by a user designating position.

An aspect of the invention is directed to a display system including a first display apparatus; and a second display apparatus, in which the first display apparatus includes a first display section that displays an image to be visually recognized in an overlapping manner with external scenery, a reception section that receives an instruction, a first communication section that performs communication with the second display apparatus, and a first control section that generates output information in response to the instruction received by the reception section, and transmits the output information to the second display apparatus by using the first communication section, and in which the second display apparatus includes a second display section that displays an image to be visually recognized in an overlapping manner with external scenery, a second communication section that performs communication with the first display apparatus, a second storage section that stores AR content including an AR image combined with external scenery visually recognized in the second display section, and a second control section that displays an image based on at least one of the AR content stored in the second storage section and the output information received by the second communication section on the second display section according to a position of the second display apparatus or a visual field of external scenery visually recognized in the second display section.

According to the aspect of the invention, when the AR content is displayed in the second display apparatus, an image can be displayed according to a position of the second display apparatus or a visual field in the second display apparatus on the basis of an instruction received by the first display apparatus. Thus, in the AR content visually recognized by a user of the second display apparatus, a designated position can be shown so as to be appropriately correlated with external scenery of a real space and to reflect the intention of a user using the first display apparatus.

The aspect of the invention may be configured such that the first control section of the first display apparatus generates the output information including at least one of an image and a voice, and transmits the output information to the second display apparatus by using the first communication section, and the second control section of the second display apparatus performs an operation of displaying the AR content stored in the second storage section on the second display section at a timing corresponding to output of a voice included in the output information, or an operation of displaying the AR content stored in the second storage section on the second display section along with an image included in the output information received by the second communication section.

According to this configuration, an image regarding a designated position received by the first display apparatus can be displayed in the second display apparatus.

The aspect of the invention may be configured such that the first control section of the first display apparatus generates a map indicating a position of the second display apparatus, and displays the map on the first display section.

According to this configuration, a user of the first display apparatus can promptly recognize a position of the second display apparatus.

The aspect of the invention may be configured such that the first control section of the first display apparatus transmits the output information including an image of the map indicating the position of the second display apparatus to the second display apparatus by using the first communication section.

According to this configuration, it is possible to notify a user of the second display apparatus of a position of the second display apparatus.

The aspect of the invention may be configured such that the first control section of the first display apparatus generates the output information including a designated position in a position designation operation received by the reception section, and the second control section of the second display apparatus displays the AR content stored in the second storage section on the second display section along with a pointer image indicating the designated position included in the output information.

According to this configuration, the designated position for the first display apparatus can be shown to a user of the second display apparatus by using the pointer image.

The aspect of the invention may be configured such that the first control section of the first display apparatus generates the output information including an image drawn through a position designation operation received by the reception section.

According to this configuration, the image drawn through an operation on the first display apparatus can be shown to a user of the second display apparatus.

The aspect of the invention may be configured such that the first display apparatus further includes a first voice input/output section that collects and outputs voices, the first control section generates the output information including voices collected by the first voice input/output control section, or voices obtained by translating words recognized from the first voices collected by the voice input/output control section, the second display apparatus further includes a second voice input/output section that collects and outputs voices, and the second control section outputs the voices included in the output information received by the second communication section via the second voice input/output section.

According to this configuration, voices can be delivered from the first display apparatus to the second display apparatus, and the voices can also be translated. Consequently, communication using voices can be performed between a user of the first display apparatus and a user of the second display apparatus.

The aspect of the invention may be configured such that the second display section displays images respectively visually recognized with the right eye and the left eye of a user at a set convergence angle, and the second control section sets a convergence angle in the second display section on the basis of setting data included in the output information received by the second communication section.

According to this configuration, convergence angles at which an image on the second display section is visually recognized by a user of the second display apparatus can be set on the basis of the output information from the first display apparatus. Thus, it is possible to adjust distances at which the user of the second display apparatus visually recognizes an image.

The aspect of the invention may be configured such that the second control section performs setting related to the second display section on the basis of setting data included in the output information received by the second communication section.

According to this configuration, it is possible to set an image on the second display section visually recognized by a user of the second display apparatus by using the first display apparatus.

The aspect of the invention may be configured such that the AR content stored in the second storage section includes an image of an avatar performing guidance for a user.

According to this configuration, a user of the second display apparatus can be guided by using an avatar image displayed on the second display section.

The aspect of the invention may be configured such that the second control section displays an image including an operation tab on the second display section, and changes display on the second display section according to an operation on the tab.

According to this configuration, a user of the second display apparatus can perform an operation on the tab.

The aspect of the invention may be configured such that the display system further includes a plurality of the second display apparatuses correlated with the first display apparatus, the first display apparatus transmits the output information to the plurality of second display apparatuses by using the first communication section, and the second display apparatus displays the AR content designated by the output information in synchronization with a timing controlled by the first display apparatus.

According to this configuration, a plurality of second display apparatuses correlated with the first display apparatus can synchronously display the AR content.

Another aspect of the invention is directed to a display apparatus including a display section that displays an image to be visually recognized in an overlapping manner with external scenery; a detection section that detects a position or a visual field of the display apparatus; a storage section that stores AR content including an AR image combined with external scenery visually recognized in the display section; and a communication section that receives output information from an external apparatus which is different from the display apparatus, in which an image based on at least one of the AR content stored in the storage section and the output information received by the communication section is displayed on the display section according to a position of the display apparatus or a visual field of external scenery visually recognized in the display section.

According to the aspect of the invention, the display apparatus displaying the AR content can display an image according to a position of the display apparatus or a visual field in the display apparatus on the basis of information received from the external apparatus. Thus, in the AR content visually recognized by a user of the display apparatus, display can be performed so as to be appropriately correlated with external scenery of a real space and to reflect the intention of a user using the external apparatus.

Still aspect of the invention is directed to a control method for a display apparatus including a display section that displays an image to be visually recognized in an overlapping manner with external scenery, a storage section that stores AR content including an AR image combined with external scenery visually recognized in the display section, and a communication section that receives output information from an external apparatus, the method including controlling the display apparatus to display an image based on at least one of the AR content stored in the storage section and the output information received by the communication section on the display section according to a position of the display apparatus or a visual field in the display apparatus.

According to the aspect of the invention, the display apparatus displaying the AR content can display an image according to a position of the display apparatus or a visual field in the display apparatus on the basis of information received from the external apparatus. Thus, in the AR content visually recognized by a user of the display apparatus, display can be performed so as to be appropriately correlated with external scenery of a real space and to reflect the intention of a user using the external apparatus.

The invention may be realized in various forms other than the above-described display apparatus and control method for the display apparatus. The invention may be realized in forms such as a program for causing a computer to execute the control method, a recording medium recording the program thereon, a server apparatus delivering the program, a transmission medium transmitting the program, and a data signal in which the program is embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
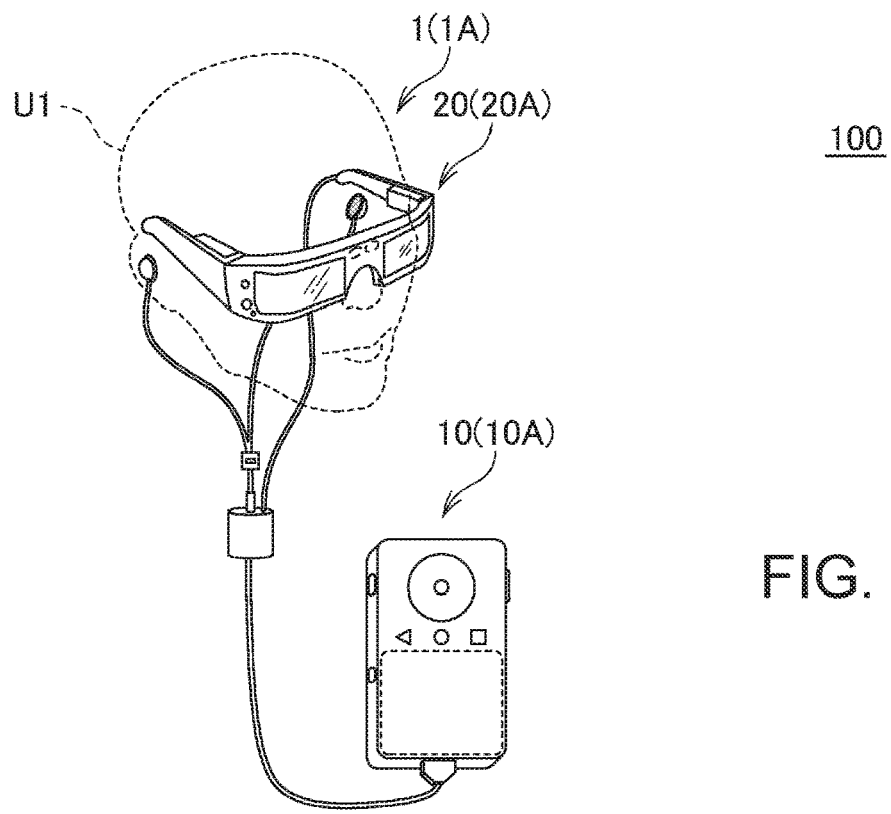
FIG. 1 is a configuration diagram of a guidance system.
Figure 1:
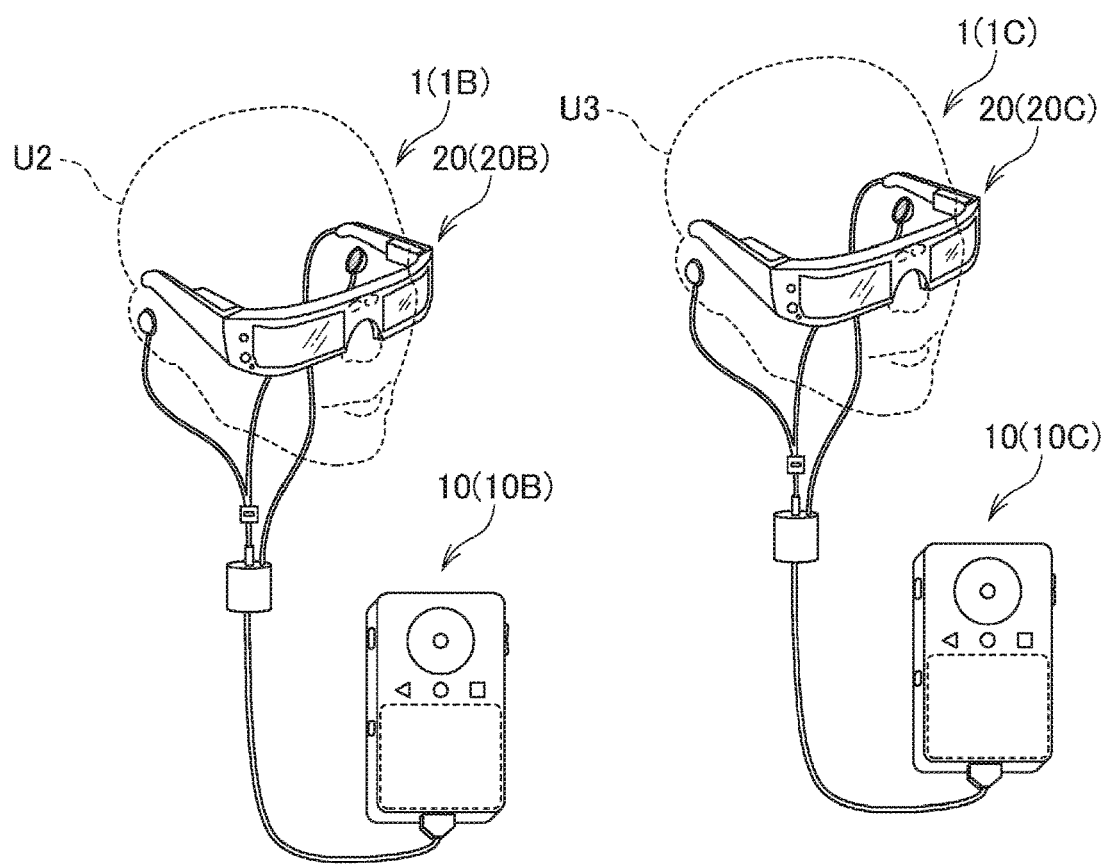

FIG. 1 is a schematic configuration diagram of a guidance system 100 according to an embodiment to which the invention is applied.

The guidance system 100 is configured so that a plurality of head mounted displays (HMDs) 1 can perform communication with each other. FIG. 1 exemplifies the guidance system 100 including three HMDs 1, but the number of HMDs 1 included in the guidance system 100 is not limited.

The number of HMDs 1 included in the guidance system 100 is not limited, and, FIG. 1 illustrates three HMDs such as an HMD 1A, an HMD 1B, and an HMD 1C as an example. The HMDs 1A, 1B and 1C of the guidance system 100 have the same configuration, and thus will be referred to as the HMD 1 in a case where the HMDs 1A, 1B and 1C are not required to be differentiated from each other. The HMD 1A corresponds to a first display apparatus, and each of the HMDs 1B and 1C corresponds to a second display apparatus.

As illustrated in FIG. 1, each of the HMDs 1A, 1B and 1C is a display apparatus mounted on the head of a user. Each of the HMDs 1A, 1B and 1C is an optically transmissive HMD which enables a user to visually recognize a virtual image and also to directly visually recognize external scenery.

In the following description, a virtual image visually recognized by a user with each of the HMDs 1A, 1B and 1C will be referred to as a "display image" for convenience. Emitting image light generated on the basis of image data will also be referred to as "displaying an image". In a description of the present embodiment, an image is not limited to a still image, and may include a moving image (video).

In a typical use form of the guidance system 100, a plurality of users U respectively wears the HMDs 1. Here, a user wearing the HMD 1A is referred to as a user U1, a user wearing the HMD 1B is referred to as a user U2, and a user wearing the HMD 1C is referred to as a user U3. The number of users is not limited to three persons such as the users U1, U2 and U3, and, in a case where the guidance system 100 includes a larger number of HMDs 1, the number of users U also increases as many. The users U1, U2 and U3 will be referred to as a user U in a case of not being differentiated from each other.

As a use example of the guidance system 100, in the present embodiment, it is assumed that the user U1 is a guide guiding a plurality of persons, and the users U2 and U3 are persons guided by the user U1. The user U1 operates the HMD 1A, so as to give an instruction to the users U2 and U3 or to guide the users U2 and U3. The HMD 1A transmits output information including images, voices, or other information to the HMDs 1B and 1C according to an operation of the user U1. The HMDs 1B and 1C output images or voices on the basis of the output information, and thus the user U1 can guide the users U2 and U3.

In the guidance system 100, the HMDs 1A, 1B and 1C can transmit and receive various pieces of data including image data, voice data, control data, and the like by performing wireless communication with each other. FIG. 1 illustrates a configuration in which wireless communication is directed performed among the HMDs 1A, 1B and 1C, but a configuration of the guidance system 100 is not limited thereto. In the guidance system 100, for example, the HMDs 1A, 1B and 1C may be communicably connected to each other via a communication network (not illustrated) including a wired communication line such as a public line network. Wireless communication may be performed through a configuration in which the guidance system 100 includes apparatuses other than the HMDs 1A, 1B and 1C, such as an access point of Wi-Fi (registered trademark).

The communication network is implemented by various communication lines such as wireless communication lines including a public line network, a dedicated line, a mobile phone line, and a backbone communication line of the lines, or a combination thereof, and a specific configuration thereof is not limited. The communication network may be a wide communication line network via which remote locations can be connected to each other, and may be a local area network (LAN) laid in a specific facility or a building. The communication network may include network apparatuses such as a server apparatus, a gateway apparatus, and a router apparatus connecting various communication lines to each other. The communication network may be formed of a plurality of communication lines.

A location where the user U1 is located and locations where the users U2 and U3 are located have no geographical limitation as long as connection to the communication network can be performed, may be remote locations, and may be neighboring locations. Therefore, the HMDs 1A, 1B and 1C may be used at neighboring positions, and may be used in a state of being far away from each other.

As will be described later, the HMD 1 displays an image with an image display section 20 so that the user U can visually recognize scenery (external scenery) of a real space, and thus the user U can visually recognize the external scenery and the image displayed on the image display section 20 in an overlapping manner. Any specific configuration of the image display section 20 may be used, but, in the present embodiment, the transmissive image display section 20 through which light (external light) incident from the outside is transmitted is exemplified.

The HMD 1A performs data communication with the HMD 1B via a wireless access point (not illustrated). The HMD 1A may directly perform wireless communication with the HMD 1B, for example, in an ad-hoc mode, and the HMDs 1A, 1B and 1C may be connected to each other via a wired communication line. In other words, a configuration of the guidance system 100 is not particularly limited as long as the HMD 1A and the HMD 1B can perform communication with each other.

The HMD 1A includes an image display section 20A mounted on the head of the user U1, and a controller 10A controlling the image display section 20A. The image display section 20A enables the user U1 to visually recognize a virtual image in a state of being mounted on the head of the user U1. The controller 10A also functions as a control device used for the user U1 to operate the HMD 1A.

The HMD 1B includes an image display section 20B and a controller 10B. The image display section 20B is the same as the image display section 20A, and enables the user U2 to visually recognize a virtual image in a state of being mounted on the head of the user U2. In the same manner as the controller 10A, the controller 10B controls the image display section 20B, and also functions as a control device used for the user U2 to operate the HMD 1B. A controller 10C is a device used by the user U3, and has the same configuration as that of the controller 10B. The controller 10A, and the controllers 10B and 10C have the same external appearance, but functional configurations thereof are different from each other, and this difference will be described later. The image display sections 20A, 20B and 20C have the same configuration.

The image display section 20A corresponds to a first display section, and each of the image display sections 20B and 20C corresponds to a second display section.

In the following description, the image display sections 20A, 20B and 20C will be referred to as an image display section 20 in a case of not being differentiated from each other. Similarly, the controllers 10A, 10B and 10C will be referred to as a controller 10 in a case of not being differentiated from each other.

Figure 2:
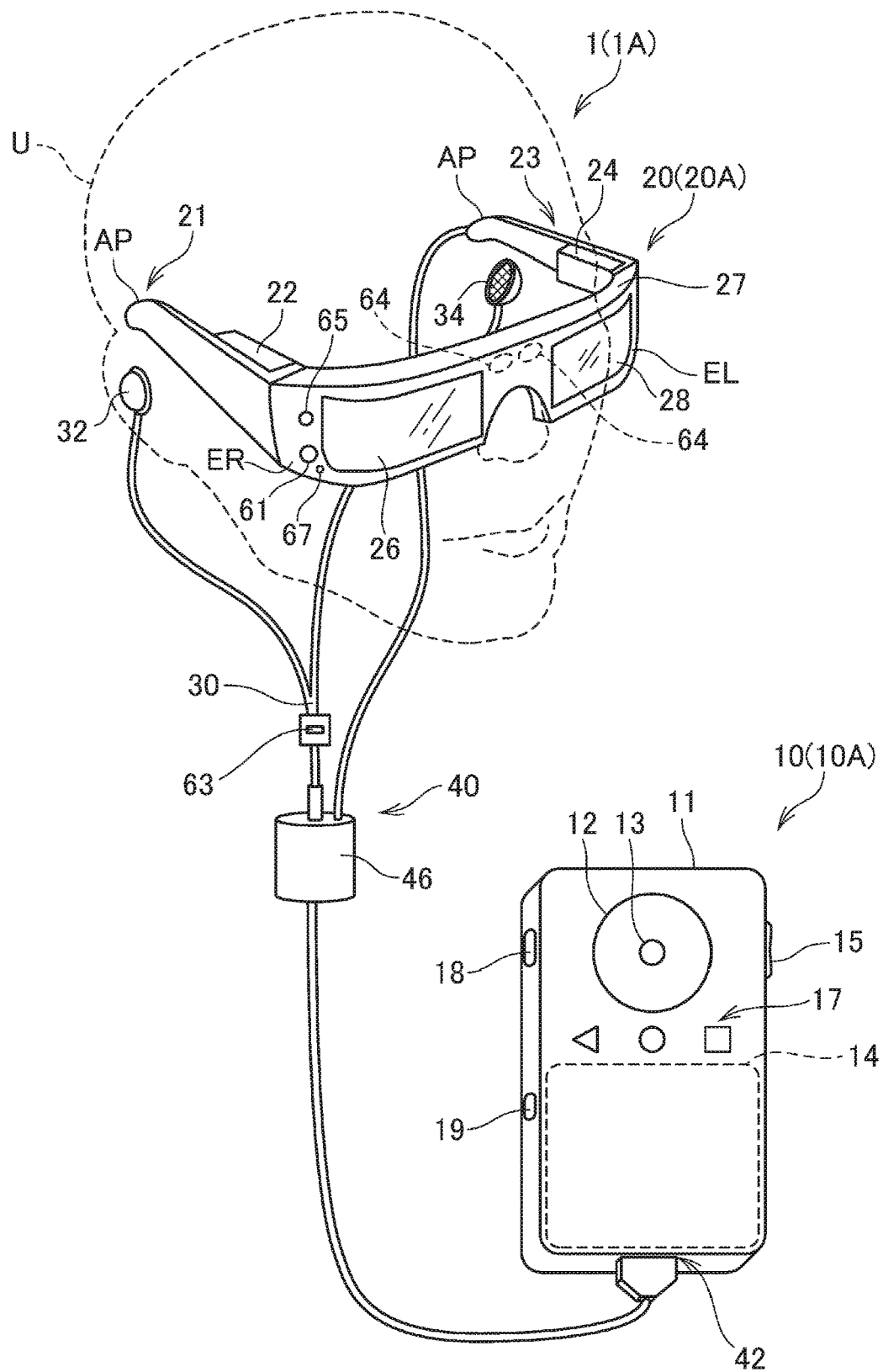
FIG. 2 is a diagram for explaining an exterior configuration of an HMD.

FIG. 2 is a diagram for explaining an external appearance configuration of the HMD 1A. The HMDs 1B and 1C have the same external appearance as that of the HMD 1A, and, thus, herein, the HMD 1A, that is, the HMD 1 will be described, and configurations and description of HMDs 1B and 1C will be omitted.

The HMD 1 is a display apparatus which is mounted on the head of the user U, and includes the image display section (display section) which enables the user U to visually recognize a virtual image in a state of being mounted on the head of the user U, and the controller 10 which controls the image display section 20. The controller 10 includes a flat box-shaped main body 11 (casing) as illustrated in FIG. 2. The main body 11 is provided with various switches, an operation pad 14, and the like receiving an operation of the user U, and the controller 10 functions as a control device controlling the HMD 1 by the user U operating the switches and the operation pad 14. The main body 11 has functional units built thereinto, controlling the HMD 1.

The image display section 20 is a mounting body which is mounted on the head of the user U, and has a spectacle shape in the present embodiment. The image display section 20 includes a right display unit 22, a left display unit 24, a right light guide plate 26, and a left light guide plate 28 on a main body having a right holding unit 21, a left holding unit 23, and a front frame 27.

The right holding unit 21 and the left holding unit 23 extent backward from both end parts of the front frame 27, and hold the image display section 20 on the head of the user U as temples of spectacles. Here, of both ends of the front frame 27, an end part located on the right side of the user U in a state in which the image display section 20 is mounted will be referred to as an end part ER, and an end part located on the left side of the user U will be referred to as an end part EL. The right holding unit 21 is provided to extend to a position corresponding to the right head of the user U from the end part ER of the front frame 27 in a state in which the image display section 20 is mounted. The left holding unit 23 is provided to extend to a position corresponding to the left head of the user U from the end part EL of the front frame 27 in a state in which the image display section 20 is mounted.

The right light guide plate 26 and the left light guide plate 28 are provided in the front frame 27. The right light guide plate 26 is located in front of the right eye of the user U in a state in which the image display section 20 is mounted, and allows the user to recognize an image with the right eye. The left light guide plate 28 is located in front of the left eye of the user U in a state in which the image display section 20 is mounted, and allows the user to recognize an image with the left eye.

The front frame 27 has a shape connecting one end of the right light guide plate 26 to one end of the left light guide plate 28, and a connection position corresponds to the glabellar of the user U when the user U wears the image display section 20. The front frame 27 may be provided with a nose contact part which is in contact with the nose of the user U at the connection position between the right light guide plate 26 and the left light guide plate 28 in a state in which the image display section 20 is mounted. In this case, the image display section 20 can be held on the head of the user U by the nose contact part, the right holding unit 21, and the left holding unit 23. A belt (not illustrated) coming into contact with the back of the head of the user U in a state in which the image display section 20 is mounted may be provided at the right holding unit 21 and the left holding unit 23, and, in this case, the image display section 20 can be held on the head of the user U by the belt.

The right display unit 22, which is a unit related to display of an image using the right light guide plate 26, is provided at the right holding unit 21, and is located near the right temporal region of the user U in a mounting state. The left display unit 24, which is a unit related to display of an image using the left light guide plate 28, is provided at the left holding unit 23, and is located near the left temporal region of the user U in a mounting state. The right display unit 22 and the left display unit 24 will be collectively referred to as a "display drive unit" in some cases.

The right light guide plate 26 and the left light guide plate 28 of the present embodiment are an operation unit made of a light transmissive resin material or the like, and are, for example, prisms, and guide image light which is output from the right display unit 22 and the left display unit 24 to the eyes of the user U.

Electronic shades (not illustrated) having a dimming function may be provided on surfaces of the right light guide plate 26 and the left light guide plate 28. Each of the electronic shades has terminals (not illustrated) to which a voltage is input, and a shade body (not illustrated) in which light transmittance changes depending on a voltage between the terminals, and an applied voltage can be adjusted under the control of a control section 150 which will be described later. The electronic shades may have a configuration in which the transmittance changes in the entire wavelength region including visible light, and may have a configuration of differing in transmittance depending on a wavelength region of light. The electronic shades are disposed to cover the surface of the front frame 27 on an opposite side to the eye sides of the user U. Optical characteristics of the electronic shades are adjusted, and thus it is possible to adjust an amount of external light which is incident to the right light guide plate 26 and the left light guide plate 28 from the outside and is transmitted through the right light guide plate 26 and the left light guide plate 28.

The image display section 20 guides image light beams generated by the right display unit 22 and the left display unit 24 to the right light guide plate 26 and the left light guide plate 28, respectively, the user U visually recognizes a virtual image based on the image light, and thus, the image display section 20 displays an image. In a case where external light is transmitted through the right light guide plate 26 and the left light guide plate 28 from the front side of the user U so as to be incident to the eyes of the user U, image light forming a virtual image and the external light are incident to the eyes of the user U, and thus visibility of a virtual image is influenced by the intensity of the external light. Thus, for example, electronic shades to the front frame 27, and optical characteristics of the dimming plates are selected or adjusted as appropriate so that ease of visibility of a virtual image can be adjusted.

A camera 61 is disposed at the front frame 27 of the image display section 20. The camera 61 preferably captures an image in a direction of external scenery visually recognized in a state in which the user U wears the image display section 20, and is provided at a position where external light transmitted through the right light guide plate 26 and the left light guide plate 28 is not blocked on the front surface of the front frame 27. In the example illustrated in FIG. 2, the camera 61 is disposed on an end part ER side of the front frame 27. The camera 61 may be disposed on an end part EL side, and may be disposed at the connection part between the right light guide plate 26 and the left light guide plate 28.

The camera 61 is a digital camera including an imaging element such as a CCD or a CMOS, and an imaging lens, and the camera 61 of the present embodiment is a monocular camera, but may be stereo camera. The camera 61 capture images of at least external scenery (real space) in a surface side direction of the HMD 1, that is, in a visual field direction of the user U in a state in which the HMD 1 is mounted. In another expression, the camera 61 captures an image in a range or a direction overlapping the visual field of the user U, and may capture an image in a gazing direction of the user U. A width of an angle of view of the camera 61 may be set as appropriate, but, in the present embodiment, as will be described later, an angle of view of the camera 61 covers an external world visually recognized by the user U through the right light guide plate 26 and the left light guide plate 28. More preferably, an imaging range of the camera 61 is set so that the entire visual field of the user U which can be visually recognized through the right light guide plate 26 and the left light guide plate 28 can be imaged.

The camera 61 performs imaging under the control of an imaging control unit 156 provided in a control section 150, and outputs captured image data to the imaging control unit 156.

The HMD 1 may be provided with distance sensors 64 detecting a distance to a measurement target object located in a preset measurement direction. The distance sensors 64 has, for example, a configuration of detecting a distance to a measurement target object located on the front side of the user U, and, in the present embodiment, are disposed, for example, at a connection part between the right light guide plate 26 and the left light guide plate 28 in the front frame 27. In this example, in a state in which the image display section 20 is mounted, positions of the distance sensors 64 may be substantially the center of both eyes of the user U in the horizontal direction, and is located above both eyes of the user U in the vertical direction. A measurement direction of the distance sensors 64 may be, for example, a surface side direction of the front frame 27, and is, in other words, a direction overlapping an imaging direction of the camera 61.

Each of the distance sensors 64 may be configured to include a light source such as an LED or a laser diode, and a light receiving portion receiving light which is emitted from the light source and is reflected at a measurement target object. The distance sensors 64 may perform a triangulation ranging process, or a ranging process based on a time difference under the control of the control section 150. The distance sensors 64 may be configured to include a sound source emitting an ultrasonic wave, and a detection portion receiving an ultrasonic wave reflected at a measurement target object. In this case, the distance sensors 64 may perform a ranging process on the basis of a time difference to reflection of an ultrasonic wave under the control of the control section 150.

The controller 10 and the image display section 20 are connected to each other via a connection cable 40. The connection cable 40 is attachably and detachably connected to a connector 42 provided on an end part of the main body 11. In other words, the main body 11 is provided with the connector 42 from and into which the connection cable 40 is removed and inserted, and the connection cable 40 is connected to the connector 42 in a case where the image display section 20 is used.

The connection cable 40 is connected to various circuits provided in the image display section 20 from a tip of the left holding unit 23. The connection cable 40 is provided with a metal cable or an optical fiber cable through which digital data is transmitted, and may be provided with a metal cable through which an analog signal is transmitted. A connector 46 is provided in the middle of the connection cable 40.

The connector 46 is a jack (audio connector) for connection to a stereo mini plug, and the connector 46 and the controller 10 are connected to each other via, for example, a line through which an analog voice signal is transmitted. In the configuration example illustrated in FIG. 2, a headset 30 including a right earphone 32 and a left earphone 34 forming a stereo headphone, and a microphone 63 is connected to the connector 46.

Figure 6:
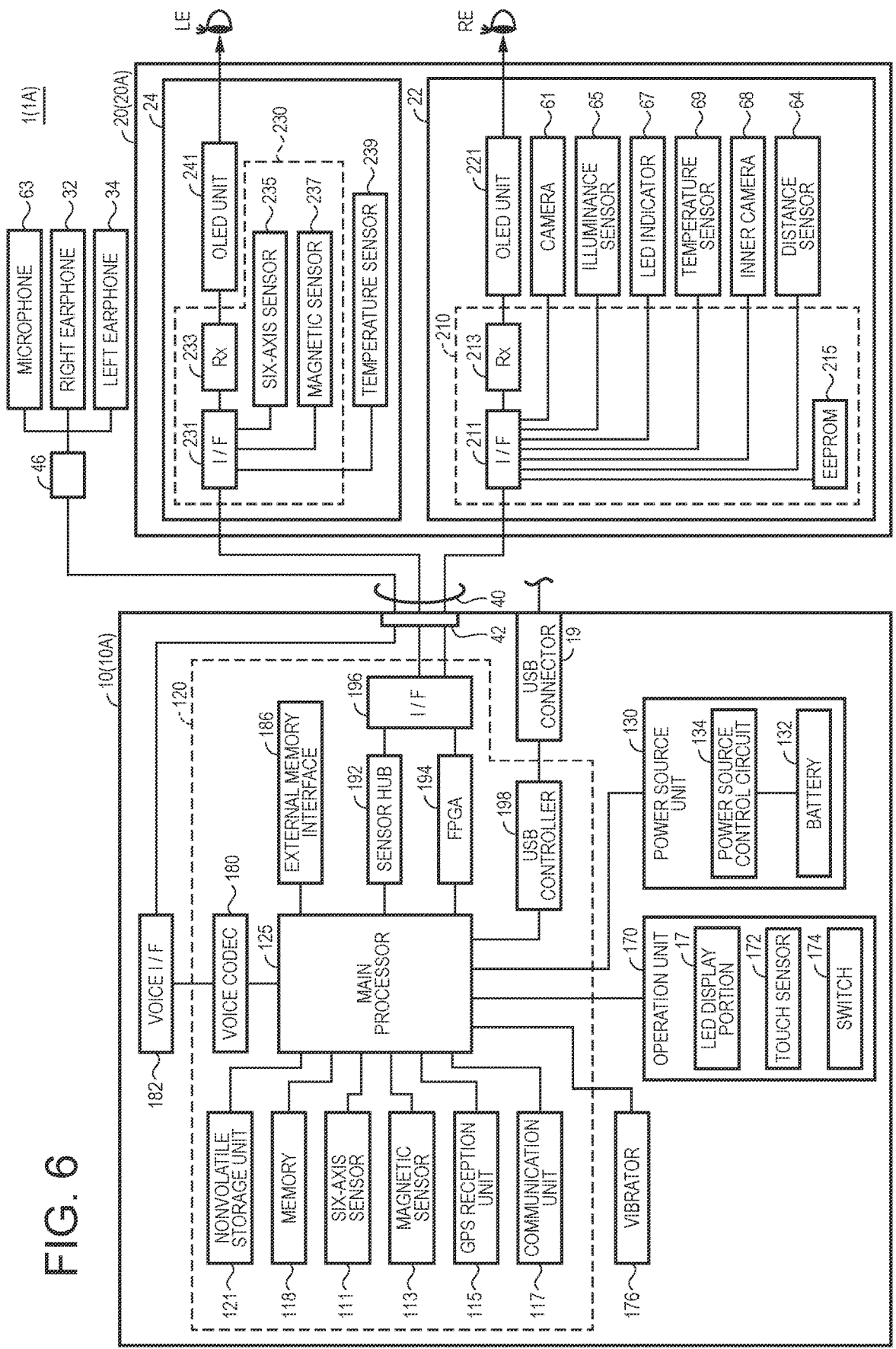
FIG. 6 is a block diagram of the HMD.

For example, as illustrated in FIG. 2, in the microphone 63, a voice collecting portion of the microphone 63 is disposed to be directed in a visual line direction of the user U, collects voices, and outputs a voice signal to a voice interface 182 (FIG. 6). The microphone 63 may be, for example, a monaural microphone, may be a stereo microphone, may be a directional microphone, and may be a non-directional microphone.

The controller 10 includes a wheel operation portion 12, a central key 13, the operation pad 14, up and down keys 15, an LED display portion 17, and a power switch 18 as operation portions operated by the user U. The operation portions are disposed on a surface of the main body 11. The operation portions are operated with, for example, the fingers of the user U.

The wheel operation portion 12 is disposed on one surface having the largest area on the surface of the main body 11. The surface on which the wheel operation portion 12 may be referred to as a front surface of the main body 11. The central key 13 is located at the center of the wheel operation portion 12. The wheel operation portion 12 preferably has a shape in which a boundary of the wheel operation portion 12 can be identified through a tactile sense of the finger by the user U on the front surface of the main body 11, and may be depressed more than the main body 11, for example. The central key 13 is, for example, swollen more than the wheel operation portion 12 so that the user U can identify a difference between the wheel operation portion 12 and the central key 13 through a tactile sense of the finger. The central key 13 may have a configuration in which a pressing operation is possible so that deformation or displacement occurs through the pressing operation.

The operation pad 14 is a region for performing a touch operation of the user U touching the finger thereto on the front surface of the main body 11. The operation pad 14 may be the same plane as the front surface of the main body 11, but preferably has a configuration in which the user U can identify the operation pad 14 from other regions. For example, a line indicating an edge of the operation pad 14 may be formed by using printing or unevenness, and surface processing may be performed on the operation pad 14 so that a tactile sense for the surface of the operation pad 14 is different from that for other regions.

The controller 10 can detect a touch operation of the user U with a touch sensor 172 (FIG. 6) which will be described later in a region including the wheel operation portion 12, the central key 13, and the up and down keys 15 on the front surface of the main body 11. In a case where the touch sensor 172 detects a touch operation, the controller 10 specifies a position where the operation is detected, and can thus specify whether the operation position of the user U is the wheel operation portion 12, the central key 13, or the operation pad 14.

Therefore, operations on the wheel operation portion 12, the central key 13, and the operation pad 14 are detected as position input operations. The controller 10 may detect the operations thereon as a position input operation without differentiating the operations from each other.

Alternatively, operations on the wheel operation portion 12, the central key 13, and the operation pad 14 may be differentiated from each other. For example, the wheel operation portion 12 may be used as a direction designation key for inputting designation of an upward-and-downward direction and a leftward-and-rightward direction. The central key 13 may be used as a determination key for an instruction for determination of the content selected through an operation on the wheel operation portion 12. The operation pad 14 may be used for an operation of inputting an absolute position or a relative position in the operation pad 14.

The light emitting diode (LED) display portion 17 is provided on the main body 11. The LED display portion 17 is located between the wheel operation portion 12 and the operation pad 14, and a surface of the LED display portion 17 is not different from other regions in the front surface of the main body 11. The LED display portion 17 is provided with a transmissive part (not illustrated) through which light can be transmitted, and emits light so that the user U can visually recognize a symbol or the like when one or a plurality of LEDs directly under the transmissive part are lighted. In the example illustrated in FIG. 2, the LEDs of the LED display portion 17 are lighted, and thus three symbols such as a triangle, a circle, and a rectangle.

The controller 10 may detect a touch operation of the finger of the user U on the LED display portion 17 with the touch sensor 172 so as to specify an operation position. Thus, for example, it is possible to specify that an operation position is a position corresponding to any one of the symbols appearing in the LED display portion 17. Therefore, the LED display portion 17 functions as software buttons. For example, the symbols appearing in the LED display portion 17 are correlated with functions of the HMD 1, and thus touch operations on the LED display portion 17 can be detected as operations for the functions. The HMD 1 may allocate the circular symbol to a home button in the example illustrated in FIG. 2. In this case, if a touch operation is performed on the position of the circular symbol, the control section 150 detects an operation on the home button. The rectangular symbol may be allocated to a history button. In this case, the control section 150 detects a touch operation on the rectangular symbol as an operation on the history button. Similarly, the triangular button may be allocated to a back button. The control section 150 detects a touch operation on the triangular symbol as an operation on the back button.

The up and down keys 15 are disposed on the side surface of the main body 11, and have a pair of keys for detecting pressing operations. The up and down keys 15 are used to input an instruction for changing volumes output from the right earphone 32 and the left earphone 34, or to input an instruction for changing brightness of display on the image display section 20.

The power switch 18 is a switch for switching between ON and OFF of power of the HMD 1, and is, for example, a slide switch.

A universal serial bus (USB) connector 19 (interface) is provided on the side surface on the same side as the power switch 18 in the main body 11. The USB connector 19 is an interface via which the controller 10 is connected to an external device, and, in the present embodiment, a connector based on the USB (registered trademark) standard will be described as an example of an interface. The USB connector 19 is a connector having a shape and a size appropriate for the microUSB standard, for example, and any specification such as a transmission speed may be employed.

As will be described later, the controller 10 has a battery 132 (FIG. 6), and the controller 10 and the image display section 20 are operated by power supplied from the battery 132. The battery 132 can be charged by supplying power through the USB connector 19. In the HMD 1, the controller 10 and the image display section 20 may be separated from each other, and charging may be performed by connecting only the controller 10 to a dedicated charging device (not illustrated).

The controller 10 can charge the battery 132 in a state of being connected to a personal computer (not illustrated) or an external device such as a charging device. The controller 10 can be activated even without being connected to the image display section 20 in a state of being connected to an external device, and may acquire data from the external device by performing data communication with the external device. As will be described later, by using this function, the controller 10 may download a fundamental control program (firmware) from the external device so as to update a fundamental control program of the controller 10. As will be described later, the controller 10 may perform a process of downloading an application program from the external device and installing the application program, or a process of downloading data from the external device and storing the data.

Figure 3:
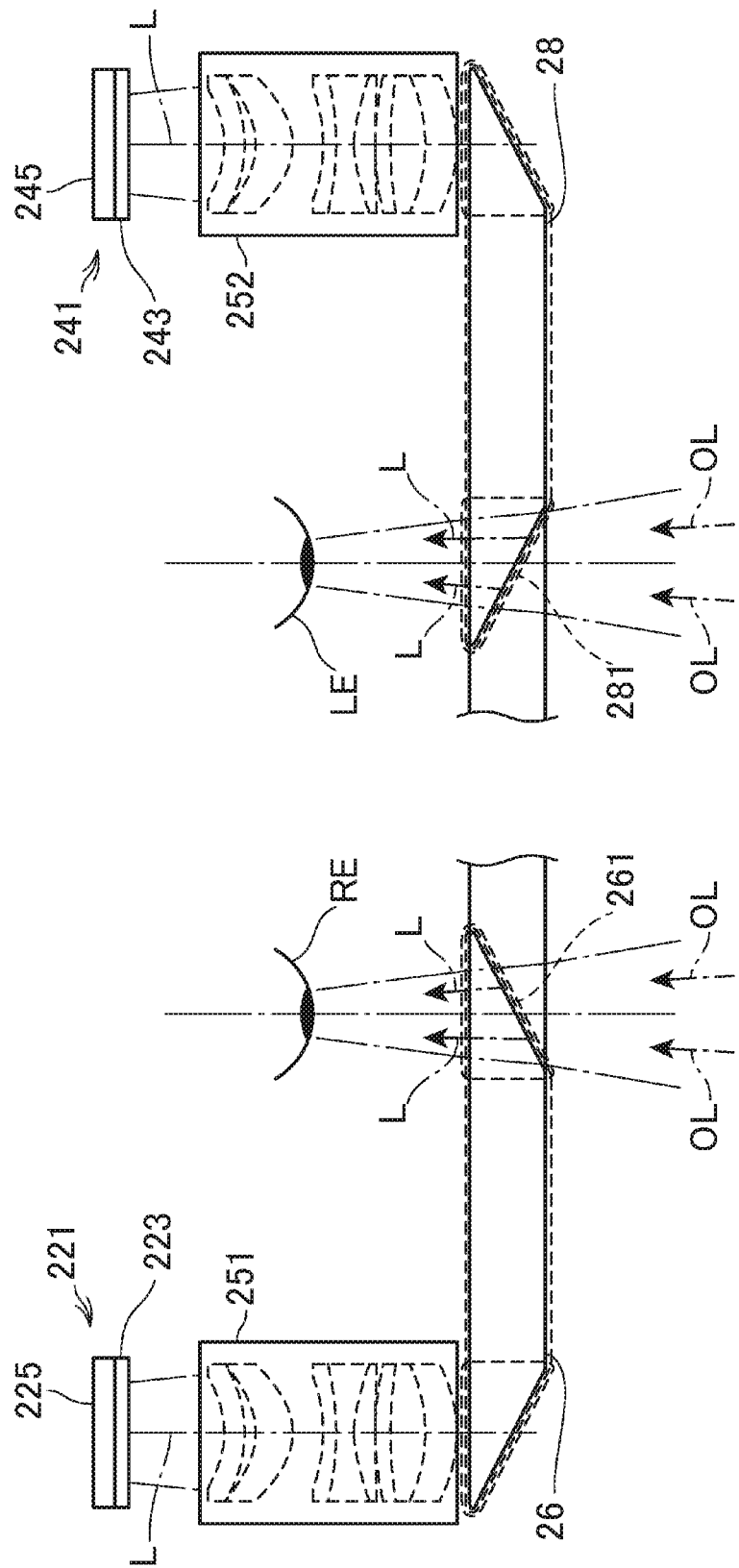
FIG. 3 is a diagram illustrating a configuration of an optical system of an image display section.

FIG. 3 is a main portion plan view illustrating a configuration of an optical system included in the image display section 20. For description, FIG. 3 illustrates the left eye LE and the right eye RE of the user U.

As illustrated in FIG. 3, the right display unit 22 and the left display unit 24 are configured to be horizontally symmetric to each other. The right display unit 22 includes an organic light emitting diode (OLED) unit 221 emitting image light and a right optical system 251 having a lens group guiding image light L emitted from the OLED unit 221, as a configuration of causing the user U to visually recognize an image with the right eye RE. The image light L is guided to the right light guide plate 26 by the right optical system 251.

The OLED unit 221 includes an OLED panel 223 and an OLED drive circuit 225 driving the OLED panel 223. The OLED panel 223 is a self-emissive display panel having a configuration in which light emitting elements emitting color light beams of red (R), green (G), and blue (B) through organic electroluminescence are disposed in a matrix. The OLED panel 223 includes a plurality of pixels with a unit including each of elements of R, G, and B as a single pixel, and forms an image by using the pixels disposed in a matrix. The OLED drive circuit 225 selects the light emitting elements of the OLED panel 223 and causes currents to flow through the light emitting elements under the control of the control section 150, and thus the light emitting elements of the OLED panel 223 emit light. The OLED drive circuit 225 is fixed to a rear surface of the OLED panel 223, that is, a rear side of a light emission surface, through bonding or the like. The OLED drive circuit 225 is formed of, for example, a semiconductor device driving the OLED panel 223, and may be mounted on a board (not illustrated) fixed to the rear surface of the OLED panel 223. A temperature sensor 69 (FIG. 6) is mounted on the board.

The OLED panel 223 may have a configuration in which light emitting elements emitting white light are disposed in a matrix, and color filters corresponding to colors of R, G, and B are disposed to overlap the light emitting elements. There may be use of the OLED panel 223 having a WRGB configuration in which light emitting elements emitting white (W) light are provided in addition to light emitting elements emitting color light beams of R, G, and B.

The right optical system 251 includes a collimator lens which converts the image light L emitted from the OLED panel 223 into a light beam in a parallel state. The image light L which is converted into the light beam in a parallel state by the collimator lens is incident to the right light guide plate 26. A plurality of reflection surfaces reflecting the image light L are formed on an optical path through which the light is guided inside the right light guide plate 26. The image light L is guided to the right eye RE side through a plurality of times of reflection inside the right light guide plate 26. A half mirror 261 (reflection surface) located in front of the right eye RE is formed in the right light guide plate 26. The image light L is reflected at the half mirror 261 so as to be emitted toward the right eye RE from the right light guide plate 26, and the image light L forms an image on the retina of the right eye RE so that the user U visually recognizes the image.

The left display unit 24 includes an organic light emitting diode (OLED) unit 241 emitting image light and a left optical system 252 having a lens group guiding image light L emitted from the OLED unit 241, as a configuration of causing the user U to visually recognize an image with the left eye LE. The image light L is guided to the left light guide plate 28 by the left optical system 252.

The OLED unit 241 includes an OLED panel 243 and an OLED drive circuit 245 driving the OLED panel 243. The OLED panel 243 is a self emissive display panel having the same configuration as that of the OLED panel 223. The OLED drive circuit 245 selects the light emitting elements of the OLED panel 243 and causes currents to flow through the light emitting elements under the control of the control section 150, and thus the light emitting elements of the OLED panel 243 emit light. The OLED drive circuit 245 is fixed to a rear surface of the OLED panel 243, that is, a rear side of a light emission surface, through bonding or the like. The OLED drive circuit 245 is formed of, for example, a semiconductor device driving the OLED panel 243, and may be mounted on a board (not illustrated) fixed to the rear surface of the OLED panel 243. A temperature sensor 239 is mounted on the board.

The left optical system 252 includes a collimator lens which converts the image light L emitted from the OLED panel 243 into a light beam in a parallel state. The image light L which is converted into the light beam in a parallel state by the collimator lens is incident to the left light guide plate 28. The left light guide plate 28 is an optical element on which a plurality of reflection surfaces reflecting the image light L are formed, and is a prism, for example. The image light L is guided to the left eye LE side through a plurality of times of reflection inside the left light guide plate 28. A half mirror 281 (reflection surface) located in front of the left eye LE is formed in the left light guide plate 28. The image light L is reflected at the half mirror 281 so as to be emitted toward the left eye LE from the left light guide plate 28, and the image light L forms an image on the retina of the left eye LE so that the user U visually recognizes the image.

According to this configuration, the HMD 1 functions as a see-through type display apparatus. In other words, the image light L reflected at the half mirror 261 and external light OL transmitted through the half mirror 261 are incident to the right eye RE of the user U. The image light L reflected at the half mirror 281 and external light OL transmitted through the half mirror 281 are incident to the left eye LE. As mentioned above, in the HMD 1, the image light L for an image processed therein and the external light OL are incident to the eyes of the user U in an overlapping manner, and the user U views external scenery through the right light guide plate 26 and the left light guide plate 28, and visually recognizes an image based on the image light L in an overlapping manner with the external scenery.

The half mirrors 261 and 281 are image extraction units extracting images by reflecting image light beams output from the right display unit 22 and the left display unit 24, and may be said to be display sections.

The left optical system 252 and the left light guide plate 28 will be collectively referred to as a "left light guide portion", and the right optical system 251 and the right light guide plate 26 will be collectively referred to as a "right light guide portion". Configurations of the right light guide portion and the left light guide portion are not limited to the above-described example, any type may be used as long as a virtual image is formed in front of the eyes of the user U, for example, a diffraction grating may be used, and a transflective film may be used.

Figure 4:
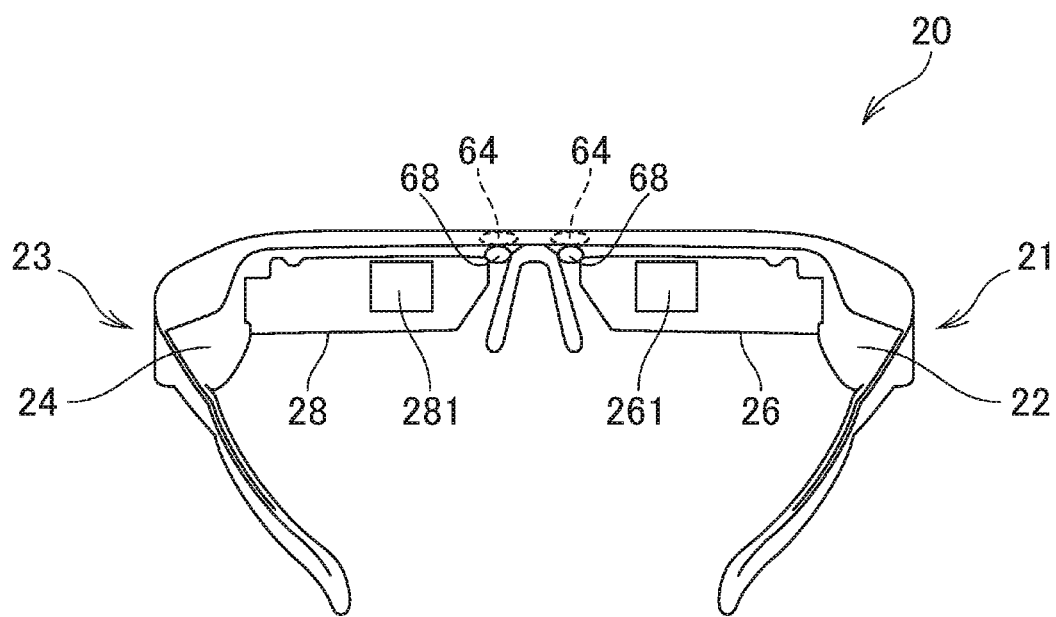
FIG. 4 is a perspective view illustrating a configuration of the image display section.
Figure 5:
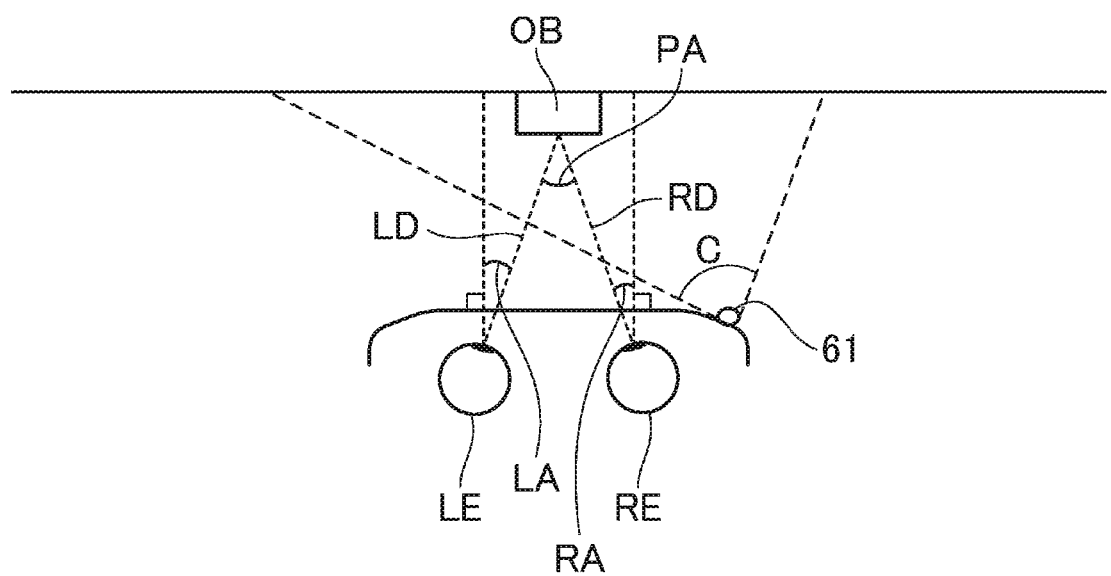
FIG. 5 is a schematic diagram illustrating a correspondence between the image display section and an imaging range.

FIGS. 4 and 5 are diagrams illustrating a main portion configuration of the image display section 20. FIG. 4 is a main portion perspective view in which the image display section 20 is viewed from the head side of the user U. In FIG. 4, the connection cable 40 is not illustrated. FIG. 5 is a diagram for explaining an angle of view of the camera 61.

FIG. 4 illustrates the sides of the image display section 20 coming into contact with the head of the user U, that is, the sides viewed from the right eye RE and the left eye LE of the user U. In other words, rear sides of the right light guide plate 26 and the left light guide plate 28 are viewed.

In FIG. 4, the half mirror 261 irradiating the right eye RE of the user U with image light and the half mirror 281 irradiating the left eye LE thereof with image light are viewed as substantially rectangular regions. The whole of the right light guide plate 26 and the left light guide plate 28 including the half mirrors 261 and 281 transmit external light therethrough. Thus, the user U visually recognizes external scenery transmitted through the whole of the right light guide plate 26 and the left light guide plate 28, and visually recognizes rectangular display images at the positions of the half mirrors 261 and 281.

As described above, the camera 61 is disposed at the right end in the image display section 20, and captures an image in a direction in which both eyes of the user are directed, that is, in a front direction of the user. FIG. 5 is a schematic plan view illustrating a position of the camera 61 along with the right eye RE and the left eye LE of the user. An angle of view (imaging range) of the camera 61 is indicated by C. FIG. 5 illustrates the angle of view C in the horizontal direction, but an actual angle of view of the camera 61 is also spread in the vertical direction in the same manner as in a general digital camera.

An optical axis of the camera 61 is set in a direction including visual line directions of the right eye RE and the left eye LE. External scenery which can be visually recognized by the user in a state of wearing the HMD 1 is not limited to infinity. For example, as illustrated in FIG. 5, if the user gazes at a target object OB with both eyes thereof, visual lines RD and LD of the user are directed toward the target object OB. For example, a distance from the user to the target object OB is generally about 30 cm to 10 m, and is more generally about 1 m to 4 m. Therefore, criteria of an upper limit and a lower limit of a distance from the user to the target object OB in normal use may be set for the HMD 1. These criteria may be obtained through research or test, and may be set by the user U. An optical axis and an angle of view of the camera 61 are preferably set so that the target object OB is included in the angle of view in a case where a distance to the target object OB in normal use corresponds to the set criterion of an upper limit and corresponds to the set criterion of a lower limit.

Generally, a human visual field angle is about 200 degrees in the horizontal direction, and is about 125 degrees in the vertical direction, and an effective visual field at which information accepting performance is excellent is about 30 degrees in the horizontal direction, and is about 20 degrees in the vertical direction. A stable gazing field at which a gazing point gazed at by a human is viewed rapidly stably is about 60 to 90 degrees in the horizontal direction and is about 45 degrees to 70 degrees in the vertical direction. In this case, a gazing point is the target object OB illustrated in FIG. 5, an effective visual field is about 30 degrees in the horizontal direction, and is about 20 degrees in the vertical direction, centering on the visual lines RD and LD. A stable gazing field is about 60 to 90 degrees in the horizontal direction, and is about 45 to 70 degrees in the vertical direction, and a visual field angle is about 200 degrees in the horizontal direction, and is about 125 degrees in the vertical direction. An actual visual field at which the user visually recognizes a target object through the image display section 20 via the right light guide plate 26 and the left light guide plate 28 may be referred to as a field of view (FOV). In the configurations of the present embodiment illustrated in FIG. 2, an FOV corresponds to an actual visual field at which the user visually recognizes a target object through the right light guide plate 26 and the left light guide plate 28. The FOV is narrower than a visual field angle and a stable gazing field, and is wider than an effective visual field.

The angle of view C of the camera 61 is preferably set so that imaging can be performed in a range wider than a visual field of the user, and, specifically, the angle of view C is more preferably wider than at least an effective visual field of the user. The angle of view C is more preferably wider than an FOV of the user. Even more preferably, the angle of view C is wider than a stable gazing field of the user, and, most preferably, the angle of view C is wider than a visual field angle of both eyes of the user.

There may be a configuration in which the camera 61 includes a so-called wide angle lens as the imaging lens, and imaging can be performed at a wide angle of view. The wide angle lens may include a lens called a superwide angle lens or a semi-wide angle lens, may be a monofocal lens, and may be a zoom lens, and the camera 61 may be configured to include a lens group formed of a plurality of lenses.

The distance sensors 64 are disposed directed toward the front side at the center of the right light guide plate 26 and the left light guide plate 28. For example, the distance sensors 64 are configured to be able to detect a distance to an object located in the front direction of the user U, such as the target object OB illustrated in FIG. 5, from the central position of the image display section 20. The user wearing the HMD 1 directs the head thereof in a gazing direction, and thus a target to be gazed at may be considered to be located on the front side of the image display section 20. Thus, if the distance sensors 64 disposed at the center of the image display section 20 sets the front direction of the image display section 20 as a detection direction 64A, a distance to a target gazed at by the user can be detected.

As illustrated in FIG. 4, inner cameras 68 are disposed on the user side of the image display section 20. A pair of inner cameras 68 are respectively provided at the central positions of the right light guide plate 26 and the left light guide plate 28 so as to correspond to the right eye RE and the left eye LE of the user. The inner cameras 68 are a pair of cameras respectively imaging the right eye RE and the left eye LE of the user. The inner cameras 68 perform imaging under the control of the control section 150. The control section 150 analyzes image data captured by the inner cameras 68. For example, the control section 150 detects reflected light at the eyeball surfaces of the right eye RE and the left eye LE or images of the pupils from the image data captured by the inner cameras 68, so as to specify visual line directions of the user. The control section 150 may obtain changes in the visual line directions of the user, so as to eyeball movement of each of the right eye RE and the left eye LE.

Here, movement of visual line directions of the user may be regarded as movement of virtual viewpoints of the user.

The control section 150 may extract images of the eyelids of the right eye RE and the left eye LE of the user from the image data captured by the inner cameras 68, so as to detect eyelid movement or states of the eyelids. In the present embodiment, an exemplary configuration is described in which the image display section 20 includes a pair of inner cameras 68 and 68, but, for example, a single inner camera 68 may be provided at the central position of the image display section 20. In this case, the single inner camera 68 preferably has an angle of view at which the right eye RE and the left eye LE can be imaged, but, for example, only one of the right eye RE and the left eye LE may be imaged by the inner camera 68. In other words, there may be a configuration in which the control section 150 detects a visual line direction, eyeball movement, eyelid movement, a state of the eyelid, and the like of either the right eye RE or the left eye LE.

In a case where visual line directions of the right eye RE and the left eye LE are detected from images captured by the inner cameras 68, the control section 150 may obtain a convergence angle of the right eye RE and the left eye LE. In FIG. 5, the convergence angle is indicated by the reference sign PA. The convergence angle PA corresponds to a distance to the target object OB gazed at by the user. In other words, in a case where the user visually recognizes an image or an object in a stereoscopic manner, a convergence angle of the right eye RE and the left eye LE is determined to correspond to a distance to a visually recognized target. Therefore, a gazing distance of the user can be obtained by detecting the convergence angle. A stereoscopic view may be induced by displaying an image so that a convergence angle of the user is induced.

A convergence angle of visual line directions of the right eye RE and the left eye LE of the user U may be obtained on the basis of, for example, image data captured by the inner cameras 68. For example, a visual line direction of the right eye RE is obtained on the basis of image data captured by the inner cameras 68, and an angle RA of the visual line direction of the right eye RE for the front direction of the right eye RE by using the visual line direction. Similarly, a visual line direction of the left eye LE is obtained on the basis of image data captured by the inner cameras 68, and an angle LA of the visual line direction of the left eye LE for the front direction of the left eye LE by using the visual line direction. The convergence angle PA is the same as a sum of the angles LA and RA, and thus the convergence angle PA can be easily obtained.

A convergence angle of visual line directions of the user U can be induced by controlling display positions where images are displayed on the half mirrors 261 and 281 by the image display section 20 under the control of the control section 150. In other words, if images are displayed at positions corresponding to a convergence angle so that visual line directions of the right eye RE and the left eye LE of the user U are induced, the user U visually recognize the images so that the images are located at a distance corresponding to the convergence angle. Through this control, the images can be visually recognized so that the images visually recognized by the user U are present at a predetermined distance included in external scenery, that is, at a position corresponding to a convergence angle defined by display positions of the images. Therefore, external scenery and images displayed on the image display section 20 can be mixed with each other, and thus the images can be more effectively displayed in an AR manner.

The configurations illustrated in FIGS. 2 to 5 are common to the HMDs 1A, 1B and 1C of the guidance system 100. A control section 450 (FIG. 8) provided in each of the HMDs 1B and 1C has the above-described functions of the control section 150, and performs the same operation as the control section 150.

FIG. 6 is a block diagram illustrating a configuration of each unit forming the HMD 1. In the same manner as in FIGS. 2 to 5, FIG. 6 illustrates a configuration of the HMD 1A. The HMDs 1B and 1C have the same configuration as that of the HMD 1A, and thus a description of the HMD 1 based on FIG. 6 is applied to the HMDs 1A, 1B and 1C.

The controller 10 includes a main processor 125 which executes a program so as to control the HMD 1. The main processor 125 is connected to a memory 118 and a nonvolatile storage unit 121. The main processor 125 is connected to an operation unit 170 as an input device. The main processor 125 is connected to a six-axis sensor 111, a magnetic sensor 113, and a GPS 115 as sensors. The main processor 125 is connected to a communication unit 117, a voice codec 180, an external memory interface 186, a USB connector 188, a sensor hub 192, and an FPGA 194. These constituent elements function as interfaces with external devices.

The main processor 125 is mounted on a controller board 120 built into the controller 10. The controller board 120 may be further mounted with the memory 118, the nonvolatile storage unit 121, and the like in addition to the main processor 125. In the present embodiment, for example, the six-axis sensor 111, the magnetic sensor 113, the GPS 115, the communication unit 117, the memory 118, the nonvolatile storage unit 121, and the voice codec 180 are mounted on the controller board 120. The external memory interface 186, the USB connector 188, the sensor hub 192, the FPGA 194, and the interface 196 may be mounted on the controller board 120.

The connector 42 and the USB connector 19 may be mounted on the controller board 120.

The memory 118 forms a work area which temporarily stores an executed program and processed data in a case where the main processor 125 executes the program. The nonvolatile storage unit 121 is formed of a flash memory or an embedded Multi Media Card (eMMC). The nonvolatile storage unit 121 stores a program executed by the main processor 125 or various pieces of data processed by the main processor 125 executing the program.

The operation unit 170 includes an LED display portion 17, the touch sensor 172, and a switch 174. The touch sensor 172 detects touch operations on the wheel operation portion 12, the central key 13, the operation pad 14, and the LED display portion 17 provided on the main body 11. The touch sensor 172 specifies an operation position of a detected touch operation. In a case where the touch sensor 172 detects the touch operation, an operation signal indicating the operation position is output to the main processor 125 from the operation unit 170.

The switch 174 detects operations on the up and down keys 15 and the power switch 18 provided in the main body 11. In a case where the switch 174 detects an operation on the switch, an operation signal indicating the operation position is output to the main processor 125 from the operation unit 170.

The LED display portion 17 includes LEDs (not illustrated) for displaying the three symbols illustrated in FIG. 2, and a drive circuit lighting the LEDs. The LED display portion 17 causes the LEDs to be lighted, to blink, and to be unlighted under the control of the main processor 125.

Referring to FIG. 6 again, the six-axis sensor 111 is a motion sensor (inertial sensor) including a three-axis acceleration sensor and a three-axis gyro (angular velocity) sensor. The six-axis sensor 111 may employ an inertial measurement unit (IMU) in which the sensors are modularized.

The magnetic sensor 113 is, for example, a three-axis geomagnetic sensor.

The global positioning system (GPS) 115 includes a GPS antenna (not illustrated), and receives a radio signal transmitted from a GPS satellite so as to detect coordinates of the present position of the controller 10.

The six-axis sensor 111, the magnetic sensor 113, and the GPS 115 output detection values to the main processor 125 according to a sampling cycle designated in advance. Alternatively, the six-axis sensor 111, the magnetic sensor 113, and the GPS 115 output the detection values to the main processor 125 at a timing designated by the main processor 125 in response to a request from the main processor 125.

The communication unit 117 performs wireless communication with external apparatuses. The communication unit 117 is configured to include an antenna RF circuit, a baseband circuit, a communication control circuit, and the like, and is formed of a device into which the constituent elements are integrated. The communication unit 117 performs wireless communication based on standards such as Bluetooth or a wireless LAN (including Wi-Fi).

The voice interface 182 is an interface via which a voice signal is input and output. In the present embodiment, the voice interface 182 includes the connector 46 (FIG. 2) provided at the connection cable 40. The voice codec 180 is connected to the voice interface 182, and performs encoding and decoding of voice signals which are input and output via the voice interface 182. The voice codec 180 may include an A/D converter performing conversion from an analog voice signal into digital voice data, and a D/A converter performing inverse conversion thereto. For example, in the HMD 1 of the present embodiment, voices are output to the right earphone 32 and the left earphone 34, and the microphone 63 collects voices. The voice codec 180 converts digital voice data output from the main processor 125 into an analog voice signal, and outputs the voice signal via the voice interface 182. The voice codec 180 converts an analog voice signal which is input to the voice interface 182 into digital voice data which is then output to the main processor 125.

The external memory interface 186 is an interface to which a portable memory device is connectable, and includes, for example, a memory card slot attached with a card type recording medium and capable of reading data, and an interface circuit. In this case, a size, a shape, and a standard of the card type recording medium are not limited, and may be changed as appropriate.

A universal serial bus (USB) connector 188 includes a connector based on a USB standard, and an interface circuit, and is connectable to a USB memory device, a smart phone, a computer, and the like. A size or a shape of the USB connector 188, and a version of an appropriate USB standard may be selected and changed as appropriate.

The HMD 1 includes a vibrator 176. The vibrator 176 includes a motor (not illustrated) and an eccentric rotor (none illustrated), and generates vibration under the control of the main processor 125. For example, in a case where an operation on the operation unit 170 is detected, in a case where the supply of power to the HMD 1 is turned on or off, or in other cases, the HMD 1 generates vibration with the vibrator 176 in a predetermined vibration pattern.

The sensor hub 192 and the FPGA 194 are connected to the image display section 20 via an interface (I/F) 196. The sensor hub 192 acquires detection values in various sensors of the image display section 20, and outputs the detection values to the main processor 125. The FPGA 194 performs processing of data which is transmitted and received between the main processor 125 and each unit of the image display section 20, and transmission using the interface 196.

The right display unit 22 and the left display unit 24 of the image display section 20 are connected to the controller 10. As illustrated in FIG. 2, in the HMD 1, the connection cable 40 is connected to the left holding unit 23, a wiring connected to the connection cable 40 is laid in the image display section 20, and thus the right display unit 22 and the left display unit 24 are connected to the controller 10.

The right display unit 22 includes a display unit board 210. The display unit board 210 is provided with an interface (I/F) 211 connected to the interface 196, a reception unit (Rx) 213 which receives data which is input from the controller 10 via the interface 211, and an EEPROM 215 (storage section).

The interface 211 connects the reception unit 213, the EEPROM 215, the temperature sensor 69, the camera 61, an illuminance sensor 65, and an LED indicator 67 to the controller 10.

The electrically erasable programmable read-only memory (EEPROM) 215 stores various pieces of data to be readable by the main processor 125. The EEPROM 215 stores data regarding light emission characteristics or display characteristics of the OLED units 221 and 241 of the image display section 20, data regarding characteristics of sensors provided in the right display unit 22 or the left display unit 24, and the like. Specifically, parameters related to gamma correction of the OLED units 221 and 241, data for compensating for detection values in the temperature sensors 69 and 239, and the like are stored. This data is generated through inspection during factory shipment of the HMD 1, so as to be written into the EEPROM 215, and the main processor 125 performs a process by using the data in the EEPROM 215 after the shipment.

The camera 61 performs imaging in response to a signal which is input via the interface 211, and outputs captured image data or a signal indicating an imaging result to the controller 10.

As illustrated in FIG. 2, the illuminance sensor 65 (external sensor) is provided at the end part ER of the front frame 27, and is disposed to receive external light from the front side of the user U wearing the image display section 20. The illuminance sensor 65 outputs a detection value corresponding to a light reception amount (light reception intensity).

As illustrated in FIG. 2, the LED indicator 67 is disposed near the camera 61 at the end part ER of the front frame 27. The LED indicator 67 is lighted during execution of imaging in the camera 61, and performs a notification that imaging is being performed.

The temperature sensor 69 detects a temperature, and outputs a voltage value or a resistance value corresponding to the detected temperature as a detection value. The temperature sensor 69 is mounted on the rear surface side of the OLED panel 223 (FIG. 3). The temperature sensor 69 may be mounted on the same board as, for example, that of the OLED drive circuit 225. With this configuration, the temperature sensor 69 generally detects the temperature of the OLED panel 223.

The reception unit 213 receives data transmitted from the main processor 125 via the interface 211. In a case where image data for an image displayed by the OLED unit 221 is received, the reception unit 213 outputs the received image data to the OLED drive circuit 225 (FIG. 3).

The left display unit 24 includes a display unit board 210. The display unit board 210 is provided with an interface (I/F) 231 connected to the interface 196, and a reception unit (Rx) 233 which receives data which is input from the controller 10 via the interface 231. The display unit board 210 is mounted with a six-axis sensor 235 and a magnetic sensor 237.

The interface 231 connects the reception unit 233, the six-axis sensor 235, the magnetic sensor 237, and the temperature sensor 239 to the controller 10.

The six-axis sensor 235 is a motion sensor (inertial sensor) including a three-axis acceleration sensor and a three-axis gyro (angular velocity) sensor. The six-axis sensor 235 may employ an inertial measurement unit (IMU) in which the sensors are modularized.

The magnetic sensor 237 is, for example, a three-axis geomagnetic sensor.

The temperature sensor 239 detects a temperature, and outputs a voltage value or a resistance value corresponding to the detected temperature as a detection value. The temperature sensor 239 is mounted on the rear surface side of the OLED panel 243 (FIG. 3). The temperature sensor 239 may be mounted on the same board as, for example, that of the OLED drive circuit 245. With this configuration, the temperature sensor 239 generally detects the temperature of the OLED panel 243.

The temperature sensor 239 may be built into the OLED panel 243 or the OLED drive circuit 245. The board may be a semiconductor board. Specifically, in a case where the OLED panel 243 is mounted as an integrated circuit on an integrated semiconductor chip along with the OLED drive circuit 245 and the like by using a Si-OLED, the temperature sensor 239 may be mounted in the semiconductor chip.

The camera 61, the illuminance sensor 65, and the temperature sensor 69 provided in the right display unit 22, and the six-axis sensor 235, the magnetic sensor 237, and the temperature sensor 239 provided in the left display unit 24 are connected to the sensor hub 192. The sensor hub 192 performs setting and initialization of a sampling cycle of each sensor under the control of the main processor 125. The sensor hub 192 performs conduction of each sensor, transmission of control data to each sensor, and acquisition of a detection value from each sensor, in accordance with the sampling cycle of each sensor. The sensor hub 192 outputs a detection value in each sensor of the right display unit 22 and the left display unit 24 to the main processor 125 at a preset timing. The sensor hub 192 may have a function of temporarily storing a detection value in each sensor in accordance with a timing at which the detection value is output to the main processor 125. The sensor hub 192 may have a function of converting data with various data formats into data with a unified data format and outputting the data to the main processor 125, in order to cope with a difference in a signal format of an output value from each sensor, or a data format.

The sensor hub 192 starts and stops conduction of the LED indicator 67 under the control of the main processor 125, and causes the LED indicator 67 to be lighted or blink in accordance with timings at which the camera 61 starts and finishes imaging.

The controller 10 includes a power source unit 130, and is operated by power supplied from the power source unit 130. The power source unit 130 includes a rechargeable battery 132, and a power source control circuit 134 which detects residual capacity of the battery 132 and controls charging of the battery 132. The power source control circuit 134 is connected to the main processor 125, and outputs a detection value of residual capacity of the battery 132 or a voltage detection value to the main processor 125. Power may be supplied to the image display section 20 from the controller 10 on the basis of power supplied from the power source unit 130. There may be a configuration in which the main processor 125 can control a state of supplying power to each unit of the controller 10, and the image display section 20, from the power source unit 130.

The power source control circuit 134 charges the battery 132 with power supplied via the USB connector 19. This operation is automatically performed by the power source control circuit 134 according to a residual capacity of the battery 132 and a state in which a current is supplied via the USB connector 19 in a case where power is supplied to the power source control circuit 134.

The USB connector 19 of the controller 10 is connected to a USB controller 198 mounted on the controller board 120, and the power source unit 130. In USB standards (USB 1.0, 1.1, 2.0, 3.0, 3.1, and the like), the USB connector 19 is mounted with four pins including data lines D+ and D−, and power source lines Vbus and GND. Above all, the power source lines Vbus and GND are connected to the power source unit 130, and, for example, in a case where a DC current is input to the USB connector 19 from the outside, the current is supplied to the power source unit 130.

The USB controller 198 is connected to the main processor 125. The USB controller 198 is connected to the pins of D+ and D− of the USB connector 19, and performs data communication using the USB connector 19 under the control of the main processor 125. The USB controller 198 may be connected to the power source lines Vbus and GND of the USB connector 19.

The USB controller 198 functions as a USB device controller, and establishes communication with a USB host device connected to the USB connector 19 so as to perform data communication. In this case, the USB controller 198 transmits information such as a USB device ID of the HMD 1 and a device class of the HMD 1 to the USB host device. Here, a host device connected to the USB connector 19 is not limited to a device which is directly connected to the USB connector 19 via a USB cable (not illustrated), and may be a device connected thereto via a USB hub. In other words, the USB controller 198 is connected to an external device as a USB device so as to perform communication. In this case, a personal computer or the like which is an external device is mounted with a USB host controller (not illustrated), and the USB host controller performs communication with the USB controller 198.

The USB controller 198 may have a function of a USB host controller in addition to a function of a USB device controller. In this case, if a USB device such as a USB storage device is connected to the USB connector 19, the USB controller 198 may control the USB device so as to write or read data.

Figure 7:
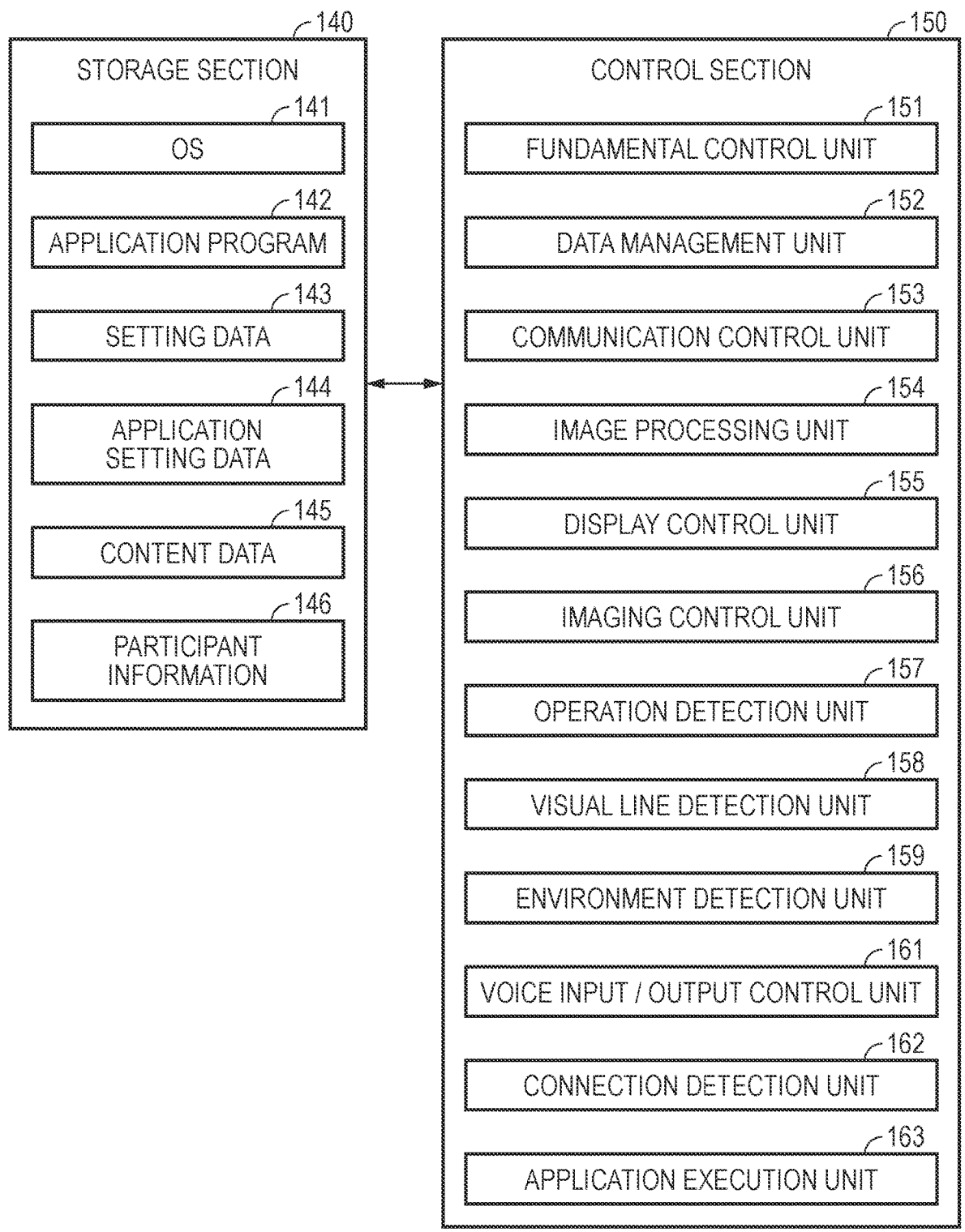
FIG. 7 is a functional block diagram of a control section and a storage section of the HMD worn by a guide.

FIG. 7 is a functional block diagram of a storage section 140 and the control section 150 forming a control system of the controller 10 of the HMD 1A. The storage section 140 illustrated in FIG. 7 is a logical storage section formed of the nonvolatile storage unit 121 (FIG. 6), and may include the EEPROM 215. The control section 150 and the various functional units of the control section 150 are formed through cooperation between software and hardware by the main processor 125 executing a program. The control section 150 and the respective functional units forming the control section 150 are formed by, for example, the main processor 125, the memory 118, and the nonvolatile storage unit 121.

The storage section 140 (first storage section) stores various programs executed by the main processor 125, and data processed by the programs. The storage section 140 stores an operating system (OS) 141, an application program 142, setting data 143, application setting data 144, and content data 145.

The control section 150 (first control section) executes the program stored in the storage section 140 so as to process the data stored in the storage section 140, and thus controls the HMD 1A.

The operating system 141 is a fundamental control program of the HMD 1A executed by the main processor 125. In a case where the power source of the HMD 1A is turned on through an operation on the power switch 18, the main processor 125 loads and executes the operating system 141. If the main processor 125 executes the operating system 141, various functions of the control section 150 are realized. The functions of the control section 150 include a fundamental control unit 151, a data management unit 152, a communication control unit 153, an image processing unit 154, a display control unit 155, an imaging control unit 156, an operation detection unit 157, an environment detection unit 159, and a voice input/output control unit 161, and a connection detection unit 162. The functions realized by the operating system 141 include an application execution unit 163.

The application program 142 is a program executed by the main processor 125 in a state in which the main processor 125 performs the operating system 141. The application program 142 uses various functions such as the fundamental control unit 151 to the connection detection unit 162 which are fundus control functions of the control section 150. The number of application program 142 stored in the storage section 140 may not be one but plural. The application program 142 is a program realizing functions such as image content reproduction, voice content reproduction, gaming, camera imaging, document creation, web browsing, schedule management, telephoning (including voice communication), video communication, and route navigation.

The setting data 143 includes various setting values related to an operation of the HMD 1A. In a case where parameters, determinants, arithmetic expressions, a lookup table (LUT), and the like are used for the control section 150 to control the HMD 1A, these may be included in the setting data 143.

The application setting data 144 is data used in a case where the application program 142 is executed in the HMD 1A. Specifically, the application setting data 144 includes data such as execution conditions in a case where various programs included in the application program 142 are executed. For example, the application setting data 144 includes an image display size and an orientation of a screen during execution of the application program 142, and data indicating functional units of the control section 150 or sensors of the HMD 1A used by the application program 142.

In the HMD 1A, when the application program 142 is introduced, an installation process is performed by using the functions of the control section 150. The installation process is a process including not only a process storing the application program 142 in the storage section 140 but also a process of setting execution conditions of the application program 142. If the application setting data 144 corresponding to the application program 142 is generated or stored in the storage section 140 through the installation process, the application execution unit 163 can activate the application program 142.

The content data 145 is data of content including a display image or video displayed on the image display section 20 under the control of the control section 150. The content data 145 includes still image data and/or video (moving image) data. A still image or a moving image displayed on the basis of the content data 145 is collectively referred to as the content. The content data 145 may include voice data. The content data 145 may include data of a plurality of pieces of content, and, in this case, the plurality of pieces of content are not limited to images which are simultaneously displayed on the image display section 20 and may be displayed in order in a switching manner.

The content data 145 may be interactive content data. In other words, in a case where the image display section 20 displays the content, display aspects of the content or the content may switch according to an operation of the user U on the controller 10. In this case, the content data 145 may have image data of a menu screen displayed in a case where an operation is received, data for defining a process corresponding to an item included in the menu screen, and the like, in addition to data of the content.

The content data 145 is the content including an image visually recognized by the user U1 using the HMD 1A, and the image may be a moving image, and may be a still image.

The content data 145 may be the same content as content data 445 (FIG. 8) stored in the HMDs 1B and 1C. In this case, the content data 145 may include AR content.

An image included in the AR content is an image visually recognized by the user U1 so as to overlap external scenery visually recognized through the image display section 20, that is, scenery or an object of a real space. An image included in the AR content is an image which allows at least external scenery to be visually recognized. The visibility of external scenery when the image display section 20 displays the AR content is specified on the basis of a ratio between an amount of image light emitted by the right display unit 22 and the left display unit 24 and an amount of external light which is incident to the right eye RE and the left eye LE from the outside of the image display section 20. The visibility in a case where external scenery is visually recognized through an image of the AR content is referred to as the transmittance of external light or the transmittance of external scenery. The transmittance of external scenery can be adjusted by adjusting display luminance of the AR content for an amount of external light.

Here, an amount of image light can be said to display luminance of the right display unit 22 and the left display unit 24. An image of the AR content is an image in which an amount of image light emitted from the right display unit 22 and the left display unit 24 is restricted to the extent to which the visibility of external light is not damaged, or an amount of image light, that is, display luminance can be adjusted by the HMD 1A. In a case where display luminance of an image included in the AR content is fixed, the visibility of external scenery can be preferably ensured except for a case where an amount of external light is extremely small. Display luminance in a case where the image display section 20 displays the AR content may be adjusted under the control of the control section 150.

The AR content may use a specific object or position of the real space as a target, and may include an image which is displayed to correspond to the target position. During display of the AR content, the image display section 20 matches or correlates a distance from the image display section 20 to a target position of the real space with a virtual distance which is recognized by the user U1 as a distance to an image of the AR content. Specifically, a convergence angle in a case where an image of the AR content is visually recognized is set by adjusting a display position at which the image of the AR content is displayed on the half mirror 261 and a display position at which the image of the AR content is displayed on the half mirror 281. A convergence angle of the right eye RE and the left eye LE is set in accordance with a distance from the image display section 20 to a target of the real space, and thus stereoscopic view of the image of the AR content can be realized. Consequently, it is possible to realize a visual effect in which the image of the AR content is located at the same distance as a distance of a target and is thus viewed at the same position. In this case, the HMD 1A may detect a distance to a target of the real space under the control of the control section 150. For example, the control section 150 may specify a target gazed at by the user U1 by detecting visual line directions of the right eye RE and the left eye LE, so as to detect a distance to a position of the target with the distance sensors 64.

The HMD 1A displays the AR content, and thus the user U1 can visually recognize an image overlapping an object of the real space. Here, in a case where the user U1 performs an operation on an AR image with a human body such as the hand or an indicator, the control section 150 may detect this operation on the basis of an image captured by the camera 61. In this case, the control section 150 may generate operation data indicating the operation content correlated with the AR content on the basis of the detected operation and a display position or a display state of an image of the AR content displayed on the image display section 20. The control section 150 may change a display state of the AR content on the basis of the operation data. For example, the control section 150 may adjust a display position in a case where an image of the AR content is displayed on the half mirrors 261 and 281, or a convergence angle at which the AR content is displayed, in response to an operation of the user U1. In this case, a position where an image of the AR content is visually recognized by the user U1 may be adjusted. The transmittance of external scenery in an image of the AR content may be adjusted in response to an operation of the user U1.

The content data 145 may include a 3D image which is 3D (stereoscopically) displayed. This 3D image may be a moving image, and may be a still image. A 3D image included in the content data 145 includes an image for the right eye RE displayed by the right display unit 22 and an image for the left eye LE displayed by the left display unit 24. Disparity between the image for the right eye RE and the image for the left eye LE may be set in advance. The disparity may be adjusted by the control section 150, and may be designated through an operation of the user U1.

Participant information 146 includes information regarding the HMD 1 which is a communication destination with which the HMD 1A communicates. In the present embodiment, the HMDs 1B and 1C are communication destinations of the HMD 1A. The participant information 146 includes various pieces of information for the HMD 1A specifying each of the HMDs 1B and 1C and performing communication. In a case where the HMDs 1A, 1B and 1C perform communication via a wireless LAN, the participant information 146 includes a MAC address, an IP address, a terminal name, and the like. Authentication information may be included in the participant information 146. For example, an ID and a password may be included. The participant information 146 may include information regarding the user U2 using the HMD 1B and the user U3 using the HMD 1C. For example, the participant information 146 may include languages used by the users U2 and U3, the ages and the names of the users U2 and U3, and other attribute information.

The fundamental control unit 151 performs a fundamental function of controlling each unit of the HMD 1A. When the power source of the HMD 1A is turned on, the fundamental control unit 151 performs an activation process, initializes each unit of the HMD 1A, and causes a state in which the application execution unit 163 can execute the application program. The fundamental control unit 151 performs a shutdown process when the power source of the controller 10 is turned off, so as to finish execution of the application execution unit 163, update various pieces of data stored in the storage section 140, and stop the HMD 1A. In the shutdown process, the supply of power to the image display section 20 is also stopped, and the whole HMD 1A is shut down.

The fundamental control unit 151 has a function of controlling the power source unit 130 to supply power. The fundamental control unit 151 separately turns off the supply of power to each unit of the HMD 1A from the power source unit 130 in the shutdown process.

The data management unit 152 manages various pieces of data stored in the storage section 140 according to an operation on the operation unit 170 and control data which is input from an external device to the USB connector 19. For example, the storage section 140 may employ a file system in which data used in the HMD 1A is managed by using a file and a folder (including a directory). In this case, the data management unit 152 performs processes such as generation, deletion, saving, copying, pasting, and name changing on a file and/or a folder storing the file, stored in the storage section 140.

The communication control unit 153 (first communication section) performs data communication by using the communication unit 117. The communication control unit 153 controls a communication function of the communication unit 117 so as to perform data communication with an apparatus which is a designated communication destination. The fundamental control unit 151 and the application execution unit 163 may transmit and receive data with other devices by using the function of the communication control unit 153, so as to use, for example, received data.

The image processing unit 154 generates signals transmitted to the right display unit 22 and the left display unit 24 on the basis of image data of an image or a video displayed on the image display section 20. The signals generated by the image processing unit 154 may be a horizontal synchronization signal, a horizontal synchronization signal, a clock signal, an analog image signal, and the like.

The image processing unit 154 may perform a resolution conversion process of converting a resolution of image data into a resolution appropriate for the right display unit 22 and the left display unit 24 as necessary. The image processing unit 154 may perform an image adjustment process of adjusting luminance or saturation of image data, a 2D/3D conversion process of creating 2D image data from 3D image data or generating 3D image data from 2D image data, and the like. In a case where such an image process is performed, the image processing unit 154 generates a signal for displaying an image on the basis of image data having undergone the process, and transmits the signal to the image display section 20 via the connection cable 40.

The image processing unit 154 may have a configuration realized by the main processor 125 executing the operating system 141, and may have a configuration realized by hardware (for example, a digital signal processor (DSP)) which is different from the main processor 125.

The display control unit 155 generates control signals for controlling the right display unit 22 and the left display unit 24, and controls generation and emission of image light from the right display unit 22 and the left display unit 24 by using the control signals. Specifically, the display control unit 155 controls the OLED drive circuits 225 and 245 to display images on the OLED panels 223 and 243. The display control unit 155 controls timings at which the OLED drive circuits 225 and 245 draw images on the OLED panels 223 and 243 and controls luminance of the OLED panels 223 and 243 on the basis of signals output from the image processing unit 154.

The imaging control unit 156 controls the camera 61 to perform imaging so that captured image data is generated and is temporarily stored in the storage section 140. In a case where the camera 61 is configured as a camera unit including a circuit generating captured image data, the imaging control unit 156 acquires captured image data from the camera 61, and temporarily stores the captured image data in the storage section 140.

The operation detection unit 157 (reception section) detects an operation in the operation unit 170, and outputs data corresponding to the operation. For example, in a case where a button or the like of the operation unit 170 is operated, the operation detection unit 157 generates operation data indicating the operation content, and outputs the operation data to the display control unit 155. The display control unit 155 changes a display state according to the operation data which is input from the operation detection unit 157.

The operation detection unit 157 detects an operation on a software button during lighting of the LED display portion 17. During lighting of the LED display portion 17, the operation detection unit 157 detects a touch operation on a position of a symbol displayed through lighting of the LED display portion 17 as an operation on a button (software operator) allocated with a function in advance.

For example, in the example illustrated in FIG. 2, a touch operation on the position of the circular symbol is detected as an operation on the home button allocated to the position of the circular symbol in advance. In this case, the operation detection unit 157 causes a display screen of the image display section 20 or an operation state of the controller 10 to transition to a fundamental state of the fundamental control unit 151.

For example, in the example illustrated in FIG. 2, a touch operation on the position of the rectangular symbol is detected as an operation on the history button allocated to the position of the rectangular symbol in advance. In this case, the operation detection unit 157 causes the image display section 20 to display a display screen of the image display section 20 or a screen showing the past operation state of the controller 10.

The operation detection unit 157 may detect an operation on the operation unit 170 so as to store a detection result in the memory 118 or the nonvolatile storage unit 121 as necessary. For example, a ring buffer may be provided in the memory 118 or the nonvolatile storage unit 121, and a detection result may be stored in the ring buffer whenever the operation detection unit 157 acquires the detection result. In this case, the latest detection results of the number corresponding to a capacity of the ring buffer are stored in the ring buffer.

A visual line detection unit 158 detects visual line directions of the user U by detecting images of the right eye RE and the left eye LE of the user U from images captured by the inner cameras 68. For example, visual line directions may be detected by using a well-known technique by detecting the pupils of the right eye RE and the left eye LE and reflected light reflected at the eyeball surfaces from captured images. The visual line detection unit 158 may detect visual line directions of the user U by detecting a direction of the head of the user U from an image captured by the camera 61. Visual line directions may be detected on the basis of both of visual line directions detected from an image captured by the camera 61 and visual line directions detected from images captured by the inner cameras 68. Visual line directions detected by the visual line detection unit 158 may be respective directions of the right eye RE and the left eye LE, and may be a gazing direction of the user U in combination of the right eye RE and the left eye LE.

The environment detection unit 159 detects a peripheral environment of the HMD 1A on the basis of a detection value from the sensor provided in the HMD 1A. Sensors controlled by the environment detection unit 159 may be, for example, the camera 61, the illuminance sensor 65, the magnetic sensor 237, and the GPS 115. The environment detection unit 159 may detect ambient brightness of the HMD 1A on the basis of an image captured by the camera 61 or a detection value from the illuminance sensor 65. The environment detection unit 159 may detect position information regarding the present position of the HMD 1A on the basis of a detection value from the GPS 115.

The voice input/output control unit 161 (first voice input/output section) controls input and output of voices in the HMD 1A. In a state in which the power source of the HMD 1A is turned on, a voice signal of voices collected by the microphone 63 is input to the voice interface 182. The voice codec 180 converts the voice signal which is input to the voice interface 182 into digital voice data, and the voice input/output control unit 161 processes the digital voice data obtained through the conversion. Processes in the voice input/output control unit 161 include, for example, a voice recognition (including text conversion) process based on the digital voice data, a voice command detection process, and a personal identification process for the user U based on voices.

The voice input/output control unit 161 performs a process of issuing voices to the user U from the HMD 1A. The voice input/output control unit 161 outputs digital voice data to the voice codec 180 on the basis of voice data included in the content data 145 or voice data included in the application program 142 or the setting data 143. The voice codec 180 converts digital voice data which is input from the voice input/output control unit 161 into an analog voice signal which is then output to the voice interface 182, and the right earphone 32 and the left earphone 34 output voices on the basis of the analog voice signal.

The connection detection unit 162 detects a connection state between the controller 10 and the image display section 20. Specifically, the connection detection unit 162 detects whether or not the interface 196 is connected to the image display section 20 via the connection cable 40.

The application execution unit 163 corresponds to a function of executing the application program 142 in a state in which the main processor 125 executes the operating system 141. The application execution unit 163 executes the application program 142 so as to realize various functions of the application program 142. The functions of the application program 142 are as exemplified above. The application execution unit 163 uses functions of the respective units of the fundamental control unit 151 to the connection detection unit 162 during execution of the application program 142.

The fundamental control unit 151 performs switching between operation modes of the HMD 1A. In the present embodiment, switching among a normal operation mode (first mode), a maintenance mode (second mode), and a sleep state (third mode) is performed. The normal operation mode is a standard operation mode of the controller 10, and an operation mode for the user U using the controller 10. In the normal operation mode, the fundamental control unit 151 may wait for execution of the application program 142, and execute the application program 142 with the application execution unit 163 in response to an operation on the operation unit 170. The normal operation mode can be said to be an operation mode of performing a normal display process in which an image is displayed on the image display section 20 by using the function of the fundamental control unit 151 and the function of the application execution unit 163.

Some of the functions which can be executed by the control section 150 are restricted in execution in the normal operation mode. These functions are referred to as restricted functions. For example, the restricted functions include a function of installing the application program 142, a function of installing or updating the operating system 141, and a setting changing function of setting functions of the HMD 1A. The setting changing function is, specifically, a function of some or the whole of the setting data 143 or the application setting data 144 according to an operation detected by the operation unit 170 or control data received by the USB connector 19 or the communication unit 117. In the setting changing function, for example, setting of a setting item related to a display aspect in the image display section 20 in the setting data 143 is changed, or setting changing is performed.

The maintenance mode is an operation mode for performing various maintenances such as changing of settings of the HMD 1A. The fundamental control unit 151 can perform the restricted function which cannot be executed in the normal operation mode, in the maintenance mode.

In the HMD 1A, the maintenance mode may be executed by activating the controller 10 in a state in which the image display section 20 is not connected to the controller 10. In this state, the normal operation mode is not executed since the controller 10 cannot control display on the image display section 20.

If the USB connector 19 is not connected to a personal computer or the like which is an external device when the controller 10 is activated in a state in which the image display section 20 is not connected, the fundamental control unit 151 shuts down the controller 10 without executing the maintenance mode.

In the maintenance mode, for example, the fundamental control unit 151 receives data from an external device, and updates the operating system 141 or installs the application program 142 by using the received data, according to control data which is input from the USB connector 19. The data received by the fundamental control unit 151 from the external device is, for example, the operating system 141 which has been updated, a program or data for update of the operating system 141, and data for installing the application program 142.

In the maintenance mode, the fundamental control unit 151 receives data from an external device, and stores the received data in the storage section 140, according to control data which is input from the USB connector 19. For example, the content data 145 can be added or updated by using this function. In the maintenance mode, the fundamental control unit 151 may delete the content data 145 according to control data which is input from the USB connector 19.

In any of the normal operation mode and the maintenance mode, the power source unit 130 can charge the battery 132 in a state in which a DC current with a predetermined voltage is supplied to the USB connector 19. Even in a state in which the power source of the controller 10 is turned off, the battery 132 can be charged in a state in which a current is supplied to the USB connector 19.

The fundamental control unit 151 may switch the HMD 1A to the sleep state in which power consumption of the HMD 1A is small. The sleep state is an operation mode for waiting by suppressing power consumption while the HMD 1A is not used, and an operation mode transitions to the sleep state from the normal operation mode, and returns to the normal operation mode if the sleep state is canceled. In the sleep state, power is supplied to a minimum of configuration units for performing detection and processes regarding cancellation of the sleep state. For example, power is supplied to the main processor 125, the touch sensor 172, and the switch 174 from the power source unit 130, and the supply of power to other respective units is stopped. Here, in the sleep state, power may be supplied to the memory 118, and the main processor 125 may use the memory 118. In the sleep state, power may be supplied to one or more of the six-axis sensor 111, the magnetic sensor 113, the six-axis sensor 235, and the magnetic sensor 237, and these sensors may be used to detect a condition for canceling the sleep state. Power may be supplied to the communication unit 117, and access from the outside through communication may be used as a condition for canceling the sleep state.

The fundamental control unit 151 causes the HMD 1A to transition to the sleep state in a case where a preset condition is established. This condition may be a condition in which, for example, the application program 142 is not executed, and a non-operation state is continued for a predetermined time or more. In a case where the fundamental control unit 151 is instructed to transition to the sleep state through the function of the application program 142, the fundamental control unit 151 may transition to the sleep state.

Figure 8:
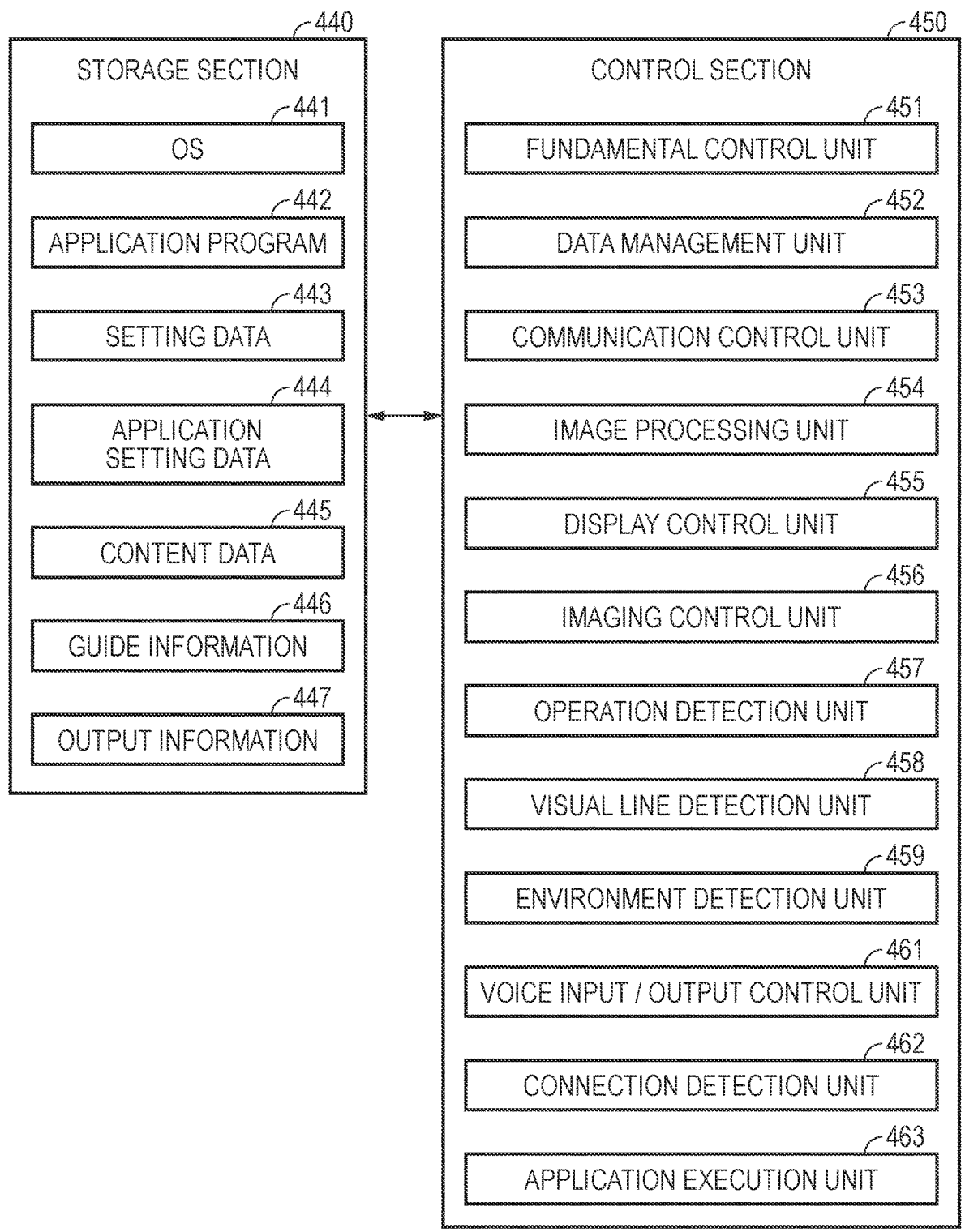
FIG. 8 is a functional block diagram of a control section and a storage section of the HMD worn by a participant.

FIG. 8 is a functional block diagram of a storage section 440 and the control section 450 forming a control system of the controller 10 of the HMD 1B. The storage section 440 illustrated in FIG. 8 is configured in the same manner as the storage section 140 (FIG. 7). In other words, the storage section 440 is a logical storage section formed of the nonvolatile storage unit 121, and may include the EEPROM 215. The control section 450 is configured in the same manner as the control section 150. In other words, the control section 450 and the various functional units of the control section 450 are formed through cooperation between software and hardware by the main processor 125 executing a program. The control section 450 and the respective functional units forming the control section 450 are formed by, for example, the main processor 125, the memory 118, and the nonvolatile storage unit 121. The HMD 1C is configured in the same manner as the HMD 1B described below.

The storage section 440 (second storage section, storage section) stores various programs executed by the main processor 125, and data processed by the programs. The storage section 440 stores an operating system (OS) 441, an application program 442, setting data 443, application setting data 444, and content data 445.

The control section 450 (second control section, control section) executes the program stored in the storage section 440 so as to process the data stored in the storage section 440, and thus controls the HMD 1B.

The operating system 441 is a fundamental control program of the HMD 1B executed by the main processor 125. In a case where the power source of the HMD 1B is turned on through an operation on the power switch 18, the main processor 125 of the HMD 1B loads and executes the operating system 441. If the main processor 125 executes the operating system 441, various functions of the control section 450 are realized. The functions of the control section 450 include a fundamental control unit 451, a data management unit 452, a communication control unit 453, an image processing unit 454, a display control unit 455, an imaging control unit 456, an operation detection unit 457, an environment detection unit 459, and a voice input/output control unit 461, and a connection detection unit 462. The functions realized by the operating system 441 include an application execution unit 463. The operating system 441 may be the same as the operating system 141 (FIG. 7).

The application program 442 is a program executed by the main processor 125 in a state in which the main processor 125 performs the operating system 441. The application program 442 uses various functions such as the fundamental control unit 451 to the connection detection unit 462 which are fundus control functions of the control section 450. The number of application program 442 stored in the storage section 440 may not be one but plural. The application program 442 is a program realizing functions such as image content reproduction, voice content reproduction, gaming, camera imaging, document creation, web browsing, schedule management, telephoning (including voice communication), video communication, and route navigation. The application program 442 may be the same as the application program 142 (FIG. 7).

The setting data 443 includes various setting values related to an operation of the HMD 1B. In a case where parameters, determinants, arithmetic expressions, a lookup table (LUT), and the like are used for the control section 450 to control the HMD 1B, these may be included in the setting data 443. The setting data 443 may be the same as the setting data 143.

The application setting data 444 is data used in a case where the application program 442 is executed in the HMD 1B. Specifically, the application setting data 444 includes data such as execution conditions in a case where various programs included in the application program 442 are executed. For example, the application setting data 444 includes an image display size and an orientation of a screen during execution of the application program 442, and data indicating functional units of the control section 450 or sensors of the HMD 1B used by the application program 442. The application setting data 444 may be the same as the application setting data 144.

In the HMD 1B, when the application program 442 is introduced, an installation process is performed by using the functions of the control section 450. The installation process is a process including not only a process storing the application program 442 in the storage section 440 but also a process of setting execution conditions of the application program 442. If the application setting data 444 corresponding to the application program 442 is generated or stored in the storage section 440 through the installation process, the application execution unit 463 can activate the application program 442.

The content data 445 is data of content including a display image or video displayed on the image display section 20 under the control of the control section 450. The content data 445 includes still image data and/or video (moving image) data. A still image or a moving image displayed on the basis of the content data 445 is collectively referred to as the content. The content data 445 may include voice data. The content data 445 may include data of a plurality of pieces of content, and, in this case, the plurality of pieces of content are not limited to images which are simultaneously displayed on the image display section 20 and may be displayed in order in a switching manner.

The content data 445 may be interactive content data. In other words, in a case where the image display section 20 displays the content, display aspects of the content or the content may switch according to an operation of the user U on the controller 10. In this case, the content data 445 may have image data of a menu screen displayed in a case where an operation is received, data for defining a process corresponding to an item included in the menu screen, and the like, in addition to data of the content.

In the present embodiment, the content data 445 includes AR content. The AR content is the content including an image visually recognized by the user U2 using the HMD 1B, or the user U3, and the image may be a moving image, and may be a still image. An image included in the AR content is an image visually recognized by the users U2 and U3 so as to overlap external scenery visually recognized through the image display section 20, that is, scenery or an object of a real space. An image included in the AR content is an image which allows at least external scenery to be visually recognized. The visibility of external scenery when the image display section 20 displays the AR content is specified on the basis of a ratio between an amount of image light emitted by the right display unit 22 and the left display unit 24 and an amount of external light which is incident to the right eye RE and the left eye LE from the outside of the image display section 20. The visibility in a case where external scenery is visually recognized through an image of the AR content is referred to as the transmittance of external light or the transmittance of external scenery. The transmittance of external scenery can be adjusted by adjusting display luminance of the AR content for an amount of external light.

Here, an amount of image light can be said to display luminance of the right display unit 22 and the left display unit 24. An image of the AR content is an image in which an amount of image light emitted from the right display unit 22 and the left display unit 24 is restricted to the extent to which the visibility of external light is not damaged, or an amount of image light, that is, display luminance can be adjusted by the HMD 1B. In a case where display luminance of an image included in the AR content is fixed, the visibility of external scenery can be preferably ensured except for a case where an amount of external light is extremely small. Display luminance in a case where the image display section 20 displays the AR content may be adjusted under the control of the control section 450. In this case, the control section 450 adjusts display luminance of the AR content, the visibility thereof for external scenery, or the transmittance of external scenery on the basis of output information transmitted from the HMD 1A.

The AR content may use a specific object or position of the real space as a target, and may include an image which is displayed to correspond to the target position. During display of the AR content, the image display section 20 matches or correlates a distance from the image display section 20 to a target position of the real space with a virtual distance which is recognized by each of the users U2 and U3 as a distance to an image of the AR content. Specifically, a convergence angle in a case where an image of the AR content is visually recognized is set by adjusting a display position at which the image of the AR content is displayed on the half mirror 261 and a display position at which the image of the AR content is displayed on the half mirror 281. A convergence angle of the right eye RE and the left eye LE is set in accordance with a distance from the image display section 20 to a target of the real space, and thus stereoscopic view of the image of the AR content can be realized. Consequently, it is possible to realize a visual effect in which the image of the AR content is located at the same distance as a distance of a target and is thus viewed at the same position. In this case, the HMD 1B may detect a distance to a target of the real space under the control of the control section 450. For example, the control section 450 may specify a target gazed at by each of the users U2 and U3 by detecting visual line directions of the right eye RE and the left eye LE, so as to detect a distance to a position of the target with the distance sensors 64.

The control section 450 may read and reproduce the content data 445, and may display an image included in the content data 445, according to output information transmitted from the HMD 1A. When an image to be reproduced is selected from among a plurality of images included in the content data 445, an image designated by the output information may be selected. In a case where moving images having a time streaming element is reproduced, a location where reproduction is started, a timing at which reproduction is started, and the like may be determined on the basis of the output information.

In a case where a reproduced image is an image of the AR content, the transmittance of external scenery or a convergence angle in the image of the AR content may be determined on the basis of the output information. In a case where 3D images included in the AR content are displayed, disparity between the 3D images may be determined according to the output information.

Guide information 446 includes information regarding the HMD 1 which is a communication destination with which the HMD 1B communicates. In the present embodiment, the HMD 1A is a communication destination of the HMD 1B. The guide information 446 includes various pieces of information for the HMD 1B specifying the HMD 1A and performing communication. In a case where the HMDs 1A, 1B and 1C perform communication via a wireless LAN, the guide information 446 includes a MAC address, an IP address, a terminal name, and the like. Authentication information may be included in the guide information 446. For example, an ID and a password may be included. The guide information 446 may include information regarding the user U1 using the HMD 1A. For example, the guide information 446 may include information regarding an organization to which the user U1 belongs and information regarding a language used by the user U1, and may include the age and the name of the user U1, and other attribute information.

Output information 447 is output information which is received by the HMD 1B from the HMD 1A. The output information includes voice data or image data as will be described later. The output information may include image data for the HMD 1B displaying an icon or an image of a pointer. The output information may include information for designating image data or voice data included in the content data 445 stored in the HMD 1B. The output information may include position information.

The fundamental control unit 451 performs a fundamental function of controlling each unit of the HMD 1B. When the power source of the HMD 1B is turned on, the fundamental control unit 451 performs an activation process, initializes each unit of the HMD 1B, and causes a state in which the application execution unit 463 can execute the application program. The fundamental control unit 451 performs a shutdown process when the power source of the controller 10 is turned off, so as to finish execution of the application execution unit 463, update various pieces of data stored in the storage section 440, and stop the HMD 1B. In the shutdown process, the supply of power to the image display section 20 is also stopped, and the whole HMD 1B is shut down. The fundamental control unit 451 may be configured in the same manner as the fundamental control unit 151.

The fundamental control unit 451 has a function of controlling the power source unit 130 to supply power. The fundamental control unit 451 separately turns off the supply of power to each unit of the HMD 1B from the power source unit 130 in the shutdown process.

The data management unit 452 manages various pieces of data stored in the storage section 440 according to an operation on the operation unit 170 and control data which is input from an external device to the USB connector 19. For example, the storage section 440 may employ a file system in which data used in the HMD 1B is managed by using a file and a folder (including a directory). In this case, the data management unit 452 performs processes such as generation, deletion, saving, copying, pasting, and name changing on a file and/or a folder storing the file, stored in the storage section 440. The data management unit 452 may be configured in the same manner as the data management unit 152.

The communication control unit 453 (second communication section) performs data communication by using the communication unit 117. The communication control unit 453 controls a communication function of the communication unit 117 so as to perform data communication with an apparatus which is a designated communication destination. The fundamental control unit 451 and the application execution unit 463 may transmit and receive data with other devices by using the function of the communication control unit 453, so as to use, for example, received data. The communication control unit 453 may be configured in the same manner as the communication control unit 153.

The image processing unit 454 generates signals transmitted to the right display unit 22 and the left display unit 24 on the basis of image data of an image or a video displayed on the image display section 20. The signals generated by the image processing unit 454 may be a horizontal synchronization signal, a horizontal synchronization signal, a clock signal, an analog image signal, and the like. The image processing unit 454 may be configured in the same manner as the image processing unit 154.

The image processing unit 454 may perform a resolution conversion process of converting a resolution of image data into a resolution appropriate for the right display unit 22 and the left display unit 24 as necessary. The image processing unit 454 may perform an image adjustment process of adjusting luminance or saturation of image data, a 2D/3D conversion process of creating 2D image data from 3D image data or generating 3D image data from 2D image data, and the like. In a case where such an image process is performed, the image processing unit 454 generates a signal for displaying an image on the basis of image data having undergone the process, and transmits the signal to the image display section 20 via the connection cable 40.

The image processing unit 454 may have a configuration realized by the main processor 125 executing the operating system 441, and may have a configuration realized by hardware (for example, a digital signal processor (DSP)) which is different from the main processor 125.

The display control unit 455 generates control signals for controlling the right display unit 22 and the left display unit 24, and controls generation and emission of image light from the right display unit 22 and the left display unit 24 by using the control signals. Specifically, the display control unit 455 controls the OLED drive circuits 225 and 245 to display images on the OLED panels 223 and 243. The display control unit 455 controls timings at which the OLED drive circuits 225 and 245 draw images on the OLED panels 223 and 243 and controls luminance of the OLED panels 223 and 243 on the basis of signals output from the image processing unit 454. The display control unit 455 may be configured in the same manner as the display control unit 155.

The imaging control unit 456 controls the camera 61 to perform imaging so that captured image data is generated and is temporarily stored in the storage section 440. In a case where the camera 61 is configured as a camera unit including a circuit generating captured image data, the imaging control unit 456 acquires captured image data from the camera 61, and temporarily stores the captured image data in the storage section 440. The imaging control unit 456 may be configured in the same manner as the imaging control unit 156.

The operation detection unit 457 detects an operation in the operation unit 170, and outputs data corresponding to the operation. For example, in a case where a button or the like of the operation unit 170 is operated, the operation detection unit 457 generates operation data indicating the operation content, and outputs the operation data to the display control unit 455. The display control unit 455 changes a display state according to the operation data which is input from the operation detection unit 457. The operation detection unit 457 may be configured in the same manner as the operation detection unit 157.

The operation detection unit 457 detects an operation on a software button during lighting of the LED display portion 17. During lighting of the LED display portion 17, the operation detection unit 457 detects a touch operation on a position of a symbol displayed through lighting of the LED display portion 17 as an operation on a button (software operator) allocated with a function in advance. For example, in the example illustrated in FIG. 2, a touch operation on the position of the circular symbol is detected as an operation on the home button allocated to the position of the circular symbol in advance. In this case, the operation detection unit 457 causes a display screen of the image display section 20 or an operation state of the controller 10 to transition to a fundamental state of the fundamental control unit 451. For example, in the example illustrated in FIG. 2, a touch operation on the position of the rectangular symbol is detected as an operation on the history button allocated to the position of the rectangular symbol in advance. In this case, the operation detection unit 457 causes the image display section 20 to display a display screen of the image display section 20 or a screen showing the past operation state of the controller 10.

The operation detection unit 457 may detect an operation on the operation unit 170 so as to store a detection result in the memory 118 or the nonvolatile storage unit 121 as necessary. For example, a ring buffer may be provided in the memory 118 or the nonvolatile storage unit 121, and a detection result may be stored in the ring buffer whenever the operation detection unit 457 acquires the detection result. In this case, the latest detection results of the number corresponding to a capacity of the ring buffer are stored in the ring buffer.

A visual line detection unit 458 detects visual line directions of the user U by detecting images of the right eye RE and the left eye LE of the user U from images captured by the inner cameras 68. For example, visual line directions may be detected by using a well-known technique by detecting the pupils of the right eye RE and the left eye LE and reflected light reflected at the eyeball surfaces from captured images. The visual line detection unit 458 may detect visual line directions of the user U by detecting a direction of the head of the user U from an image captured by the camera 61. Visual line directions may be detected on the basis of both of visual line directions detected from an image captured by the camera 61 and visual line directions detected from images captured by the inner cameras 68. Visual line directions detected by the visual line detection unit 458 may be respective directions of the right eye RE and the left eye LE, and may be a gazing direction of the user U in combination of the right eye RE and the left eye LE. The visual line detection unit 458 may be configured in the same manner as the visual line detection unit 158.

The environment detection unit 459 detects a peripheral environment of the HMD 1B on the basis of a detection value from the sensor provided in the HMD 1B. Sensors controlled by the environment detection unit 459 may be, for example, the camera 61, the illuminance sensor 65, the magnetic sensor 237, and the GPS 115. The environment detection unit 459 may detect ambient brightness of the HMD 1B on the basis of an image captured by the camera 61 or a detection value from the illuminance sensor 65. The environment detection unit 459 may detect position information regarding the present position of the HMD 1B on the basis of a detection value from the GPS 115. The environment detection unit 459 may be configured in the same manner as the environment detection unit 159.

The voice input/output control unit 461 controls input and output of voices in the HMD 1B. In a state in which the power source of the HMD 1B is turned on, a voice signal of voices collected by the microphone 63 is input to the voice interface 182. The voice codec 180 converts the voice signal which is input to the voice interface 182 into digital voice data, and the voice input/output control unit 461 processes the digital voice data obtained through the conversion. Processes in the voice input/output control unit 461 include, for example, a voice recognition (including text conversion) process based on the digital voice data, a voice command detection process, and a personal identification process for the user U based on voices. The voice input/output control unit 461 may be configured in the same manner as the voice input/output control unit 161.

The voice input/output control unit 461 performs a process of issuing voices to the user U from the HMD 1B. The voice input/output control unit 461 outputs digital voice data to the voice codec 180 on the basis of voice data included in the content data 445 or voice data included in the application program 442 or the setting data 443. The voice codec 180 converts digital voice data which is input from the voice input/output control unit 461 into an analog voice signal which is then output to the voice interface 182, and the right earphone 32 and the left earphone 34 output voices on the basis of the analog voice signal.

The connection detection unit 462 detects a connection state between the controller 10 and the image display section 20. Specifically, the connection detection unit 462 detects whether or not the interface 196 is connected to the image display section 20 via the connection cable 40.

The application execution unit 463 corresponds to a function of executing the application program. 442 in a state in which the main processor 125 executes the operating system 441. The application execution unit 463 executes the application program 442 so as to realize various functions of the application program 442. The functions of the application program 442 are as exemplified above. The application execution unit 463 uses functions of the respective units of the fundamental control unit 451 to the connection detection unit 462 during execution of the application program 442. The application execution unit 463 may be configured in the same manner as the application execution unit 163.

The fundamental control unit 451 performs switching between operation modes of the HMD 1B. In the same manner as the HMD 1A, the HMD 1B performs switching among a normal operation mode (first mode), a maintenance mode (second mode), and a sleep state (third mode). These are the same as those in the HMD 1A. Some of the functions which can be executed by the control section 450 are restricted functions in the same manner as in the fundamental control unit 151, and execution thereof in the normal operation mode is restricted. For example, the restricted functions include a function of installing the application program 442, a function of installing or updating the operating system. 441, and a setting changing function of setting functions of the HMD 1B. The setting changing function is, specifically, a function of some or the whole of the setting data 443 or the application setting data 444 according to an operation detected by the operation unit 170 or control data received by the USB connector 19 or the communication unit 117. In the setting changing function, for example, setting of a setting item related to a display aspect in the image display section 20 in the setting data 443 is changed, or setting changing is performed.

The maintenance mode is an operation mode for performing various maintenances such as changing of settings of the HMD 1B. The fundamental control unit 451 can perform the restricted function which can be executed in the normal operation mode, in the maintenance mode. In the HMD 1B, the maintenance mode may be executed by activating the controller 10 in a state in which the image display section 20 is not connected to the controller 10. In this state, the normal operation mode is not executed since the controller 10 cannot control display on the image display section 20.

If the USB connector 19 is not connected to a personal computer or the like which is an external device when the controller 10 is activated in a state in which the image display section 20 is not connected, the fundamental control unit 451 shuts down the controller 10 without executing the maintenance mode.

In the maintenance mode, for example, the fundamental control unit 451 receives data from an external device, and updates the operating system 441 or installs the application program 442 by using the received data, according to control data which is input from the USB connector 19. The data received by the fundamental control unit 451 from the external device is, for example, the operating system 441 which has been updated, a program or data for update of the operating system 441, and data for installing the application program 442.

In the maintenance mode, the fundamental control unit 451 receives data from an external device, and stores the received data in the storage section 440, according to control data which is input from the USB connector 19. For example, the content data 445 can be added or updated by using this function. In the maintenance mode, the fundamental control unit 451 may delete the content data 445 according to control data which is input from the USB connector 19.

In any of the normal operation mode and the maintenance mode, the power source unit 130 can charge the battery 132 in a state in which a DC current with a predetermined voltage is supplied to the USB connector 19. Even in a state in which the power source of the controller 10 is turned off, the battery 132 can be charged in a state in which a current is supplied to the USB connector 19.

The fundamental control unit 451 may switch the HMD 1B to the sleep state in which power consumption of the HMD 1B is small. The sleep state is an operation mode for waiting by suppressing power consumption while the HMD 1B is not used, and an operation mode transitions to the sleep state from the normal operation mode, and returns to the normal operation mode if the sleep state is canceled. In the sleep state, power is supplied to a minimum of configuration units for performing detection and processes regarding cancellation of the sleep state. For example, power is supplied to the main processor 125, the touch sensor 172, and the switch 174 from the power source unit 130, and the supply of power to other respective units is stopped. Here, in the sleep state, power may be supplied to the memory 118, and the main processor 125 may use the memory 118. In the sleep state, power may be supplied to one or more of the six-axis sensor 111, the magnetic sensor 113, the six-axis sensor 235, and the magnetic sensor 237, and these sensors may be used to detect a condition for canceling the sleep state. Power may be supplied to the communication unit 117, and access from the outside through communication may be used as a condition for canceling the sleep state.

The fundamental control unit 451 causes the HMD 1B to transition to the sleep state in a case where a preset condition is established. This condition may be a condition in which, for example, the application program 442 is not executed, and a non-operation state is continued for a predetermined time or more. In a case where the fundamental control unit 451 is instructed to transition to the sleep state through the function of the application program 442, the fundamental control unit 451 may transition to the sleep state.

A description will be made of an operation of the guidance system 100.

Figure 9:
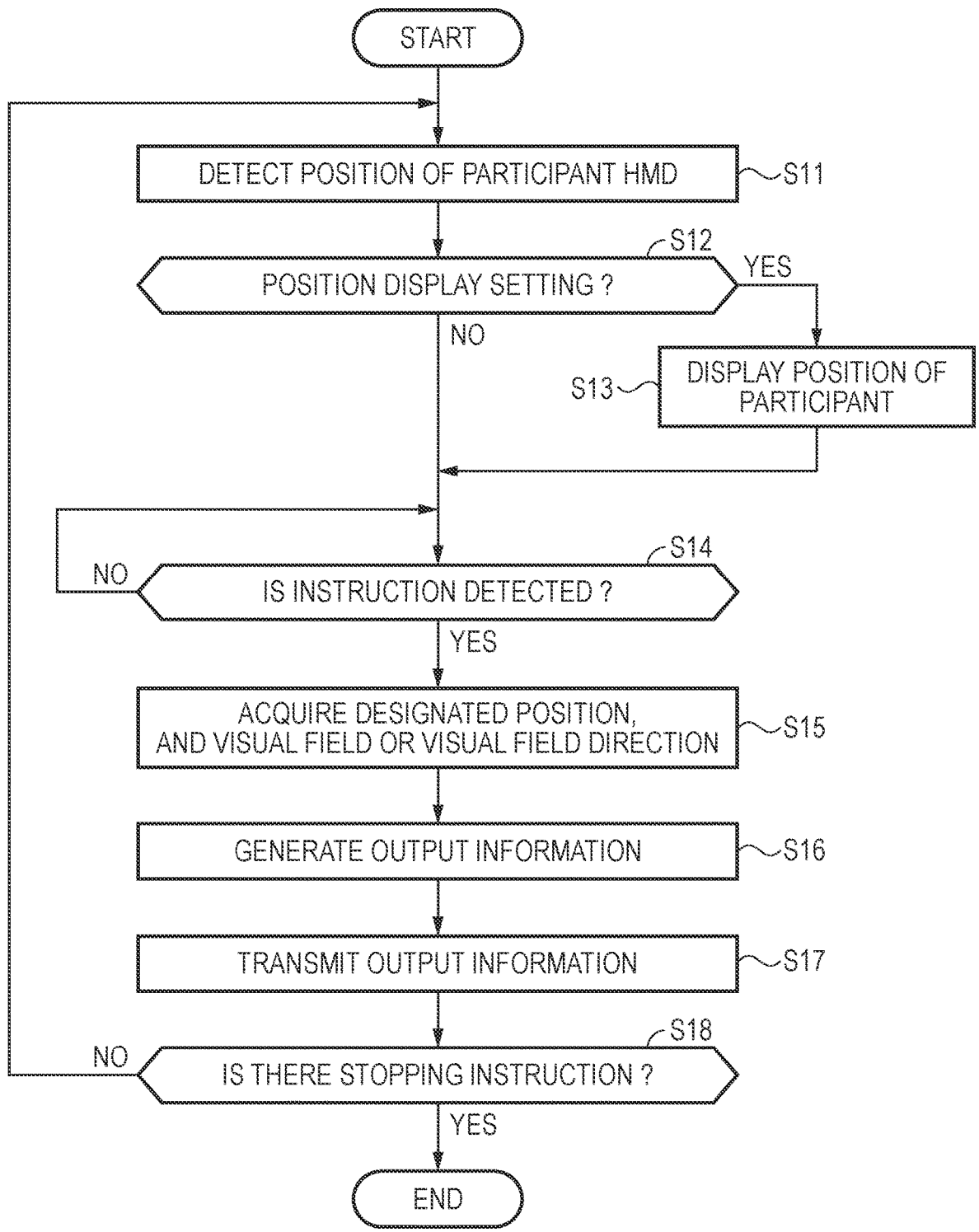
FIG. 9 is a flowchart illustrating an operation of the HMD.
Figure 10:
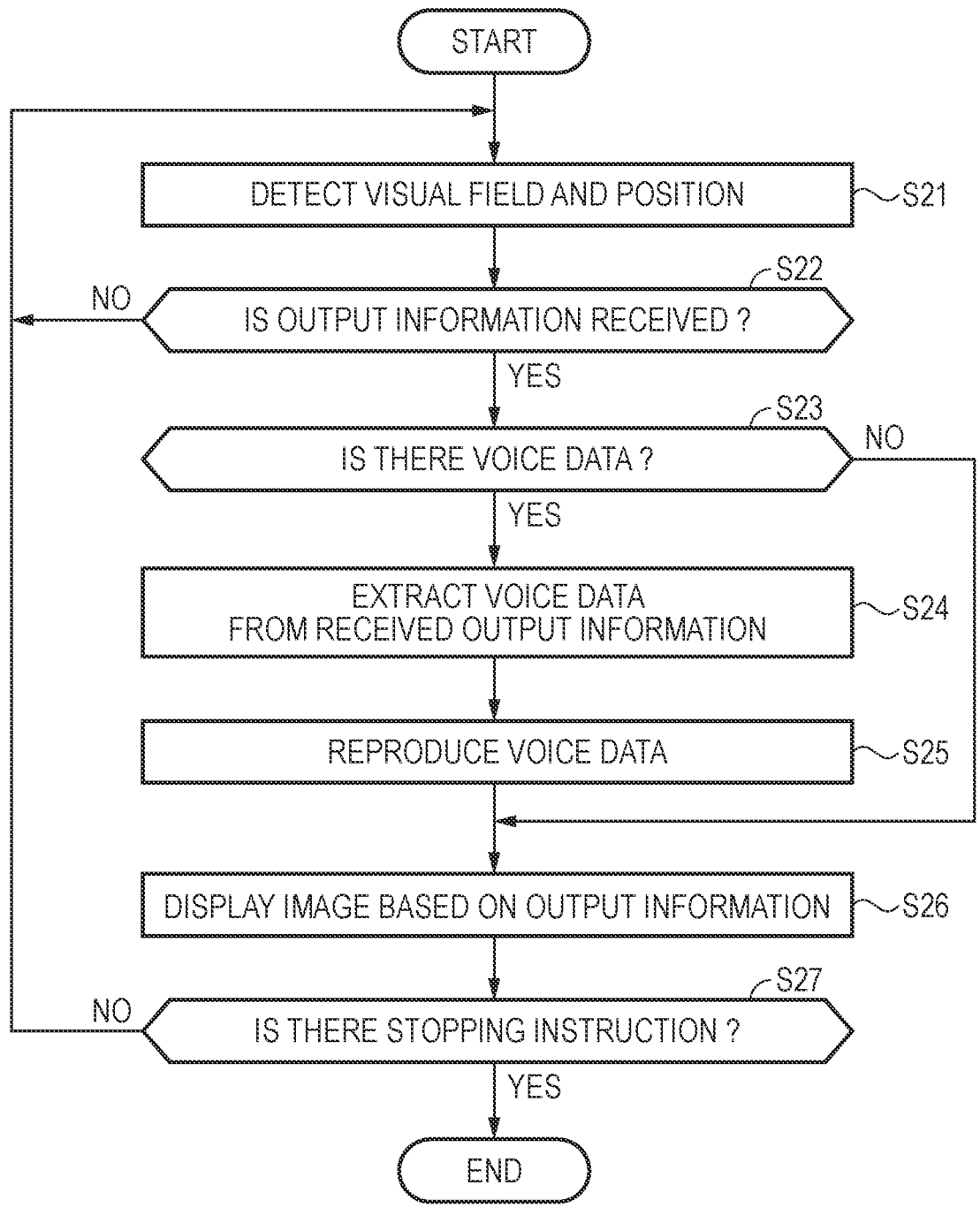
FIG. 10 is a flowchart illustrating an operation of the HMD.

FIGS. 9 and 10 are flowcharts illustrating an operation of the guidance system 100. As described above, in the guidance system 100, the user U1 using the HMD 1A guides the users U2 and U3 using the HMDs 1B and 1C. In a case where this guidance is performed, FIG. 9 is a flowchart illustrating an operation of the HMD 1A, and FIG. 10 is a flowchart illustrating an operation of the HMD 1B. An operation of the HMD 1C is the same as that of the HMD 1B. For example, the HMD 1C may perform the operation illustrated in FIG. 10 at the same timing as that of the HMD 1B. In other words, in the guidance system 100, the HMD 1B and the HMD 1C may perform the operation illustrated in FIG. 10 while the guidance is performed by using the HMD 1A.

The HMD 1A detects positions of the HMDs 1B and 1C according to the function of the control section 150 (step S11). In the HMD 1B, the control section 450 performs an operation of detecting the present position through positioning using the function of the GPS 115 or a wireless communication technique in the communication unit 117. This operation is performed at a preset timing, a timing designated by the HMD 1A, or in a preset cycle. The control section 150 detects the positions by acquiring data indicating the present positions detected by the HMDs 1B and 1C through data communication with the HMDs 1B and 1C in step S11.

Figure 11:
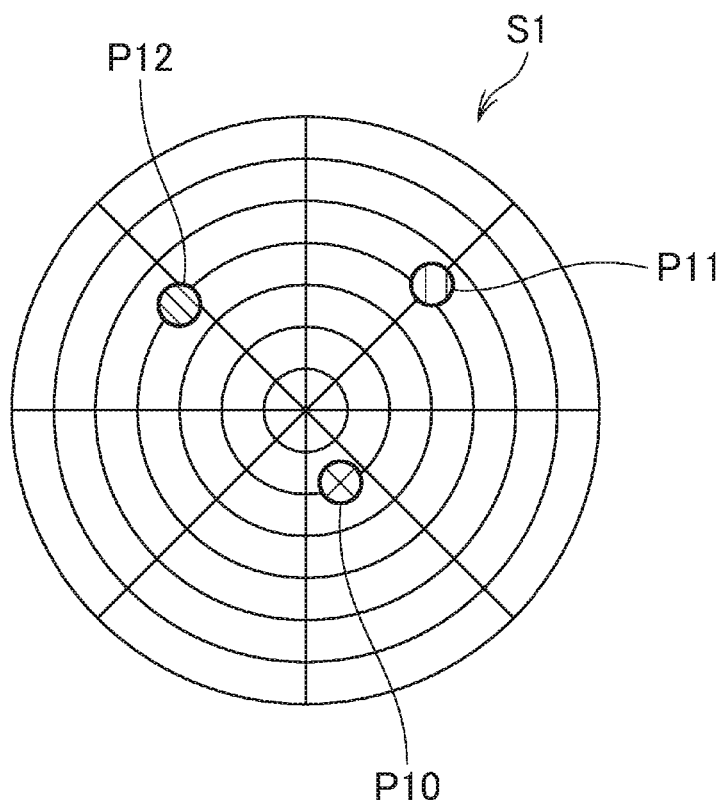
FIG. 11 is a diagram for explaining an operation and a display example in the HMD.

FIG. 11 illustrates an example of a position display image S1 which can be displayed on the image display section 20 by the control section 150 in a case where the control section 150 detects positions of the HMDs 1B and 1C in step S11.

The position display image S1 illustrated in FIG. 11 is an image schematically illustrating a position of each of the HMDs 1A, 1B and 1C in a preset range. A range included in the position display image S1 is set as appropriate in accordance with a position of the HMD 1A. In the example illustrated in FIG. 11, the symbol P10 indicating a position of the HMD 1A, the symbol P11 indicating a position of the HMD 1B, and the symbol P12 indicating a position of the HMD 1C are displayed to overlap a grid. Only the symbols P11 and P12 indicating the positions of the HMDs 1B and 1C may be displayed on the position display image S1, and, in this case, setting the center of the position display image S1 at the position of the HMD 1A is more useful.

The position display image S1 is displayed on, for example, the image display section 20A under the control of the controller 10A. Whether or not the position display image S1 is displayed may be set in advance, or may be set through an operation of the user U1. The user U1 can easily understand a position of each of the users U2 and U3 who are guidance targets by using the position display image S1.

The position display image S1 is generated by the control section 150 on the basis of the position information detected by the control section 150 in step S11. The control section 150 may cause the position display image S1 to be included in output information, and may transmit the output information to the HMDs 1B and 1C.

In a case where the HMD 1A displays the position display image S1, the HMD 1A may output alert in a case where the HMD 1B or the HMD 1C comes out of the set range. For example, this case is a case where positions of the HMDs 1B and 1C are not included in a range (or a region) which is set in advance as a target range of the position display image S1, or a range (for example, within a radius of 10 m, within a radius of 20 m, within a radius of 30 m, or within a radius of 50 m) which is set centering on a position of the HMD 1A. In this case, the HMD 1A may perform a notification by using voices or display on the image display section 20. Output information including alert may be transmitted from the HMD 1A to the HMD 1B or the HMD 1C coming out of the range. In this case, the output information may include information such as a map indicating a position of the HMD 1A.

As in the position display image S1 exemplified in FIG. 11, positions of a group of the HMDs 1 forming the guidance system 100 are displayed in the units of the HMDs 1, and thus the HMD 1A can understand locations of the respective HMDs 1. Consequently, it is possible to take a roll call for the users U1, U2 and U3 to go to the next destination (sightseeing spot) due to guidance of the user U1. During display of the position display image S1, the HMD 1A may take a roll call by receiving information transmitted from the HMDs 1B and 1C and correlating the information with the HMDs 1B and 1C displayed on the position display image S1. In this case, instead of information transmitted from the HMDs 1B and 1C, Bluetooth Low Energy (BLE) type information worn by the users U2 and U3 may be acquired.

Referring to FIG. 9 again, the control section 150 determines whether or not a setting state of displaying the position display image S1 is set (step S12). In a case where the state of displaying the position display image S1 is set (step S12; Yes), the control section 150 displays the position display image S1 on the image display section 20 (step S13), and proceeds to step S14. On the other hand, in a case where the state of displaying the position display image S1 is not set (step S12; No), the control section 150 proceeds to step S14.

In step S14, the control section 150 determines whether or not an instruction from the user U1 is detected (step S14), and waits while an instruction is not detected (step S14; No). In step S14, the control section 150 detects a position designation operation performed by the user U1 with the operation detection unit 157. For example, in a case where the user U1 performs an operation of designating a position with an indicator such as the finger in a visual field in which the user U1 visually recognizes a target object through the image display section 20, the designated position is detected. For example, the operation detection unit 157 acquires an image captured by the camera 61, extracts an image of the indicator from the captured image, and obtains relative coordinates of the image of the indicator and the image captured by the camera 61. The operation detection unit 157 calculates the obtained coordinate of the indicator as a coordinate of the detected designated position in the visual field of the user U1 on the basis of an angle of view of the camera 61 and a direction of the image display section 20. In a case where an instruction is detected (step S14; Yes), the control section 150 acquires a designated position, and a visual field of the user U1 or directions of the visual field in which the user U1 visually recognizes a target object (step S15). The directions of the visual field are visual line directions of the right eye RE and the left eye LE of the user U1, and may be obtained on the basis of, for example, a direction of the head of the user U1. The directions of the visual field may be expressed as relative directions for a reference position (for example, a grid centering on the center of the position display image S1) of the position display image S1, or by using the east, west, south and north orientations as a reference. The visual field may be expressed by a direction of the visual field and a visual field angle centering on the direction of the visual field. In this case, the control section 150 may use detection values from the magnetic sensor 113, the GPS 115, and the magnetic sensor 237. A position may be detected through communication between a wireless beacon (not illustrated) provided at a location where the HMD 1A is present and the communication unit 117.

The indicator is not limited to a human finger, and may employ objects such as an indication rod, a digit, and a pen, and preferably has a shape of being able to be held with the hand of the user U1. An operation on the operation pad 14 may be detected as a position designation operation instead of a position designation operation using an indicator. A position designation operation using other operation devices such as a remote controller (not illustrated) having an LED and an air mouse (not illustrated) may be detected.

The control section 150 generates output information on the basis of the information acquired in step S15 (step S16). The control section 150 transmits the generated output information to the HMDs 1B and 1C (step S17). In step S17, the control section 150 may simultaneously transmit the output information to all except for the HMD 1A among the HMDs 1 forming the guidance system 100.

Thereafter, the control section 150 determines whether or not there is an instruction for stopping the operation (step S18), and finishes this process in a case where there is the instruction (step S18; Yes). In a case where there is no stopping instruction (step S18; No), the control section 150 returns to step S11.

The control section 450 of the HMD 1B detects a visual field and a position of the user U2 as illustrated in FIG. 10 (step S21). An operation of the control section 450 detecting a visual field and a position of the user U2 may be performed in the same manner as in step S15 in FIG. 9.

The control section 450 determines whether or not output information is received from the HMD 1A (step S22). In a case where the output information is received (step S22; Yes), the control section 450 temporarily stores the output information received by the communication unit 117 in the storage section 440 as the output information 447. The control section 450 determines whether or not voice data is included in the output information 447 (step S23). In a case where the voice data is included (step S23; Yes), the control section 450 extracts the voice data from the output information 447 (step S24), and reproduces and outputs voices by using the voice input/output control unit 461 on the basis of the extracted voice data (step S25).

In a case where the output information is not received (step S22; No), the control section 450 returns to step S21.

Thereafter, the control section 450 displays an image on the image display section 20 on the basis of information included in the output information 447 (step S26).

Thereafter, the control section 450 determines whether or not there is an instruction for stopping the operation (step S27), and finishes this process in a case where there is the instruction (step S27; Yes). In a case where there is no stopping instruction (step S27; No), the control section 450 returns to step S21.

With reference to FIGS. 12 to 16, a description will be made of a specific operation example of the guidance system 100 in a case where the operations illustrated in FIGS. 9 and 10 are performed. Each of the FIGS. 12 to 16 is a diagram for explaining an operation and a display example of the HMD 1.

Figure 12A:
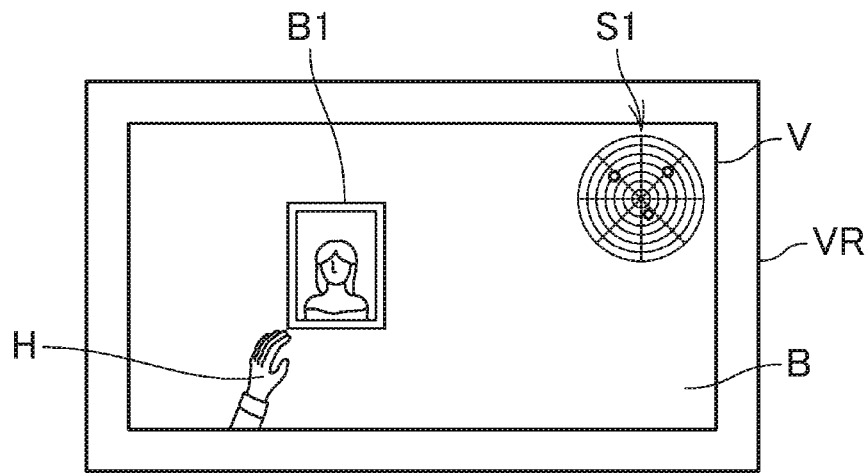
FIGS. 12A and 12B are diagrams for explaining an operation and a display example in the HMD.
Figure 12B:
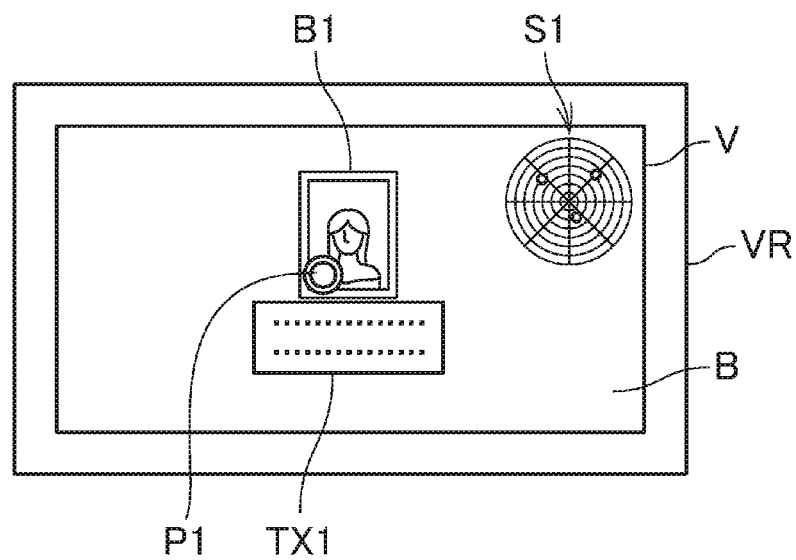

FIGS. 12A and 12B illustrate a display example in a case where the user U1 wears the HMD 1A, and performs guidance in an art gallery. In this case, the users U2 and U3 respectively wear the HMDs 1B and 1C, and move in the art gallery along with the user U1.

In FIG. 12 and the drawings described below, the reference sign VR indicates a visual field in which the user U visually recognizes a target object through the image display section 20, and the reference sign V indicates a display region in which the image display section 20 displays an image. The reference sign B indicates external scenery visually recognized by the user U on the basis of external light transmitted through the image display section 20.

FIG. 12(*a*) illustrates a display example in the HMD 1A. FIG. 12(*a*) illustrates an example in which a real object B1 present in the real space is included in the external scenery B visually recognized by the user U1. In the example illustrated in FIG. 12(*a*), the position display image S1 is displayed in the display region V. In this example, the user U1 performs an operation of pointing out the real object B1 with the hand H. The control section 150 detects the operation of the user U1 using the hand H, and specifies the real object B1 in the external scenery B corresponding to the operation position from an image captured by the camera 61. The control section 150 detects that a designated position is a position corresponding to the real object B1, generates output information including information for specifying the real object B1 as the designated position using the hand H, and transmits the output information to the HMDs 1B and 1C. The control section 150 may cause a designated position of the hand H for a position of the real object B1 to be included in the output information. The HMD 1B causes information for designating the content regarding the real object B1 of the content data 445 stored in the storage section 440 to be included in the output information.

FIG. 12(*b*) illustrates a display example in the HMD 1B. The control section 450 of the HMD 1B displays an image on the image display section 20B on the basis of the output information. The position display image S1 is displayed in the display region V of the image display section 20B on the basis of the output information 447. A pointer P1 is displayed to correspond to the real object B1 visually recognized through the image display section 20B. A display position of the pointer P1 is a position corresponding to the real object B1 visually recognized by the user U2. In other words, the HMD 1B displays the pointer P1 so that a relative position of the real object B1 to the designated position of the hand H detected by the HMD 1A corresponds to a relative position between the pointer P1 and the real object B1. In this case, the control section 450 converts the designated position of the hand H included in the output information 447 in accordance with a direction and a size (range) of a visual field of the user U2, and determines a display position of the pointer P1 to correspond to the real object B1. In other words, a positional relationship between the real object B1 and the hand H visually recognized by the user U1 is substantially the same as a positional relationship between the real object B1 and the pointer P1 visually recognized by the user U2. Thus, the user U2 using the HMD 1B can recognize a location designated by the user U1 in the HMD 1A, with the pointer P1.

The image display section 20B displays guidance information TX1 in the display region V. The guidance information TX1 is information for guidance corresponding to the real object B1, and includes, for example, an image or text. For example, in a case where the real object B1 is a picture, the guidance information TX1 includes text for explaining an author or origin of the picture. The guidance information TX1 is included in the content data 445 stored in the storage section 440 of the HMD 1B. Information for designating the guidance information TX1 included in the content data 445 is included in the output information 447. A display position of the guidance information TX1 is determined by the control section 450. In this case, information indicating that the guidance information TX1 corresponds to the real object B1 is included in the output information 447, and the control section 450 specifies a position of the real object B1 in the display region V on the basis of a captured image in the camera 61 or position information of the HMD 1A and the HMD 1B. The control section 450 determines a display position of the guidance information TX1 in accordance with the position of the real object B1, and AR displays the guidance information TX1.

In a case where the display illustrated in FIG. 12 is performed, the HMD 1A may perform display on two or more screens, that is, display on the image display section 20A and the image display sections 20B and 20C. The HMD 1A simultaneously outputs a notification to the HMDs 1B and 1C, and thus the HMD 1A can perform display control, an operation, and recognition of locations with respect to the HMDs 1B and 1C. Consequently, in a case where a plurality of users U wearing the HMDs 1 move in a group, the same information can be simultaneously delivered from the HMD 1A, and can also be separately delivered to the HMDs 1B and 1C from the HMD 1A.

The pointer P1 is not limited to a single type. For example, two types of pointers having different shapes or colors may be displayed in a switching manner in the HMDs 1B and 1C, so as to correspond to the type of operation of the hand H in the HMD 1A. An image of a virtual fingertip or an arm may be displayed as the pointer P1, and output information including an image of the pointer P1 may be transmitted from the HMD 1A.

Here, there may be a configuration in which, in the HMD 1A, the control section 150 displays a menu image in the display region V, and the real object B1 is selected and designated from among real objects included in the visual field VR through an operation of the user U1 on the menu. In this case, the control section 150 may detect the real object B1 from, for example, a captured image in the camera 61 in response to an operation using the hand H, and may transmit output information including information for designating the real object B1.

The control section 450 may set a position where other real objects (for example, a pathway or stairs) located in the visual field VR are not hindered from being visually recognized as a display position of the guidance information TX1 or the position display image S1. Different pieces of information may be displayed as the guidance information TX1 in the HMD 1B and the HMD 1C. In this case, differing guidance may be performed for the user U2 and the user U3. Since the pointer P1 for guidance and explanation is displayed, an instruction from the user U1 can be delivered to the users U2 and U3 in a better understanding manner. In a case where the control section 450 determines a display position of the pointer P1, a direction of the head or visual line directions of the user U2 wearing the image display section 20B may be reflected.

The HMD 1B outputs voices via the right earphone 32 and the left earphone 34 along with the display illustrated in FIG. 12(b), and thus the user U1 can give an instruction or perform guidance based on voices. In this case, output information transmitted from the HMD 1A includes voice data of voices collected by the microphone 63 of the HMD 1A. The HMD 1A or the HMD 1B may perform voice recognition on the voice data included in the output information so that the content said by the user U1 is displayed in the display region V as text, or the content said by the user U1 is translated.

The HMD 1B may display an image of the hand H of the user U1 instead of the pointer P1. In this case, it may be difficult to capture an image of the hand of the user U1 with the camera 61 of the HMD 1A. In this case, an image of the upper half of the body of the user U1, captured in advance, or an image of an avatar of the user U1 may be included in output information so as to be transmitted to and displayed by the HMD 1B. The HMD 1A may perform imaging by using an external camera for imaging the HMD 1A, or may acquire an image captured by the external camera. Consequently, an image captured by the camera 61 of the HMD 1A is displayed to the peripheral users U2 and U3 wearing the HMDs 1B and 1C, and thus image display for taking face to face can be provided.

The HMDs 1B and 1C may cause disparity in images displayed in the display region V so that a convergence angle is controlled. For example, display positions of the guidance information TX1 may be different in the half mirror 261 and the half mirror 281 in order to evoke a visual effect in which the guidance information TX1 is located at the substantially same distance as the real object B1. A captured image obtained by imaging the real object B1 with the camera 61 may be transmitted to and displayed in the HMDs 1B and 1C. In this case, an explanation may be made so that the slightly separated users U2 and U3 really feel the real object B1 so as to recall a sense of reality.

In the guidance system 100, various content explanations can be AR displayed as in, for example, the guidance information TX1, and can thus be efficiently really made. The number of people can be recognized through simultaneous communication from the HMD 1A to the HMDs 1B and 1C, and therefore it is possible to improve problems such as simply display of past information, and a poor visible way of a real object blocking a visual field in a group by mounting the HMDs 1B and 1C, and thus to smoothly go around various routes.

By applying the above-described simultaneous delivery technique, it is possible to realize a configuration in which a guide such as a bus guide wears the HMD 1A as the user U1, and an AR image or voice guidance is simultaneously transmitted to the HMDs 1B and 1C from the HMD 1A. In this case, timings at which an AR image or voices are output to the HMDs 1B and 1C may be synchronized with each other under the control of the HMD 1A. In this case, the plurality of HMDs 1A, 1B and 1C may be paired with each other in advance so as to receive the same video or voice. Among the plurality of paired HMDs, the HMD 1A functions as an HMD of a guide, and performs simultaneous delivery, and thus it is possible to perform synchronization between AR images or voice signals, and a combination thereof among the plurality of paired HMDs. The HMD 1A functioning as a master is in a state of having a control right due to being able to control output of an image or a voice of the AR content in the HMDs 1B and 1C on the basis of output information. Therefore, installation or setting change of an application, reproduction of a voice or an image, and the like can be controlled by the HMD 1A without being performed through operations of the users U2 and U3.

In the example illustrated in FIG. 12, the content displayed to correspond to the real object B1 is not limited to the guidance information TX1, and, for example, in a museum, an image of an exhibit may be displayed. As an example, there may be an example in which, in a case where a bone specimen of a dinosaur is the real object B1, an image of an appearance of the dinosaur during living is AR displayed to overlap the real object B1, or an example in which the dinosaur is AR displayed as a 3D image. In this example, the image of the dinosaur which is AR displayed may be moved, or the extent to which the image of the dinosaur protrudes may be changed in real time by adjusting disparity of the 3D image, according to an operation of an explainer who is the user U1. Display luminance of an AR image on the image display section 20 may be adjusted depending on an installation location of the real object B1 which is an exhibit or brightness of the real object B1, and this adjustment may be controlled on the master HMD 1A side. The transmittance of external scenery may be controlled according to the content of an image of the AR content on the basis of output information transmitted from the HMD 1A.

Figure 13:
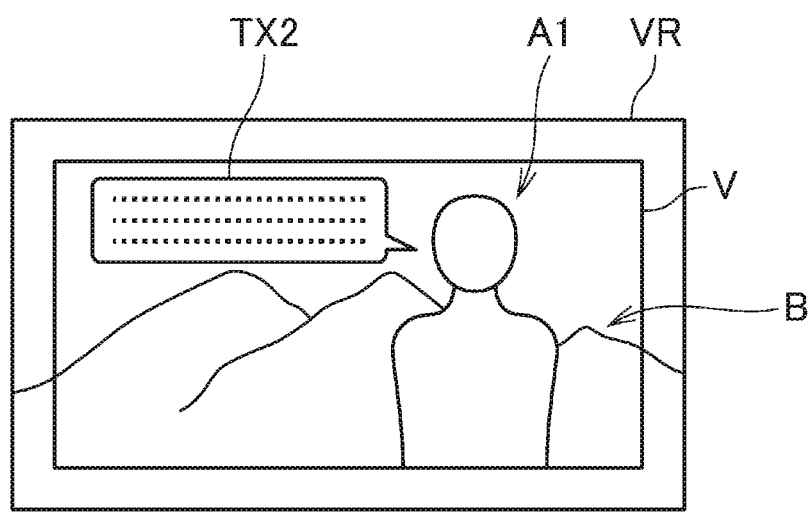
FIG. 13 is a diagram for explaining an operation and a display example in the HMD.

FIG. 13 illustrates another display example in the HMDs 1B and 1C.

The display example illustrated in FIG. 13 is an example in which the control section 450 of each of the HMDs 1B and 1C reproduces the content data 445 on the basis of the output information 447. An avatar image A1 and guidance information TX2 are displayed to overlap the external scenery B in the display region V. The avatar image A1 and the guidance information TX2 are included in the content for tourist information included in the content data 445, and the avatar image A1 is moved and deformed, and text of the guidance information TX2 is updated, with the passage of time. Consequently, the users U2 and U3 can receive guidance of causing a presence feeling as in a case where a real person performs guidance. Display positions of the avatar image A1 and the guidance information TX2 are determined in accordance with a position of the external scenery B in the same manner as in the example described in FIG. 12(b). Consequently, the avatar image A1 or the guidance information TX2 can be AR displayed with respect to an object included in the external scenery B.

A plurality of pieces of content may be included in the content data 445. In the example illustrated in FIG. 13, the content suitable for a position and a direction of a visual field of each of the HMDs 1B and 1C is designated through an operation of the user U1 using the HMD 1A, and information for designating the content is included in output information. In this case, output information transmitted to the HMD 1B from the HMD 1A may be different from output information transmitted to the HMD 1C from the HMD 1A.

The HMDs 1B and 1C respectively reproduce the content in accordance with directions of visual fields of the users U2 and U3, and thus the content appropriate for the users U2 and U3 can be reproduced even in a case where the users U2 and U3 do not have knowledge of an area viewed as the external scenery B.

Figure 14A:
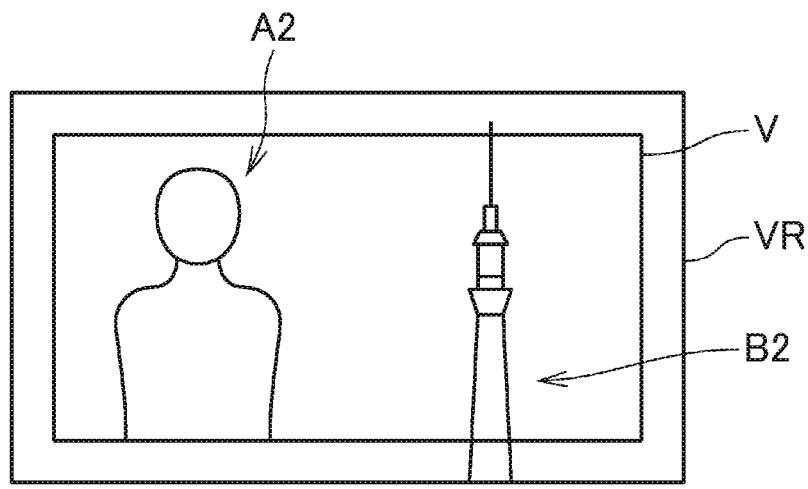
FIGS. 14A and 14B are diagrams for explaining an operation and a display example in the HMD.
Figure 14B:
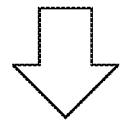

FIGS. 14A and 14B illustrate still another display example in the HMDs 1B and 1C.

Figure 14B:
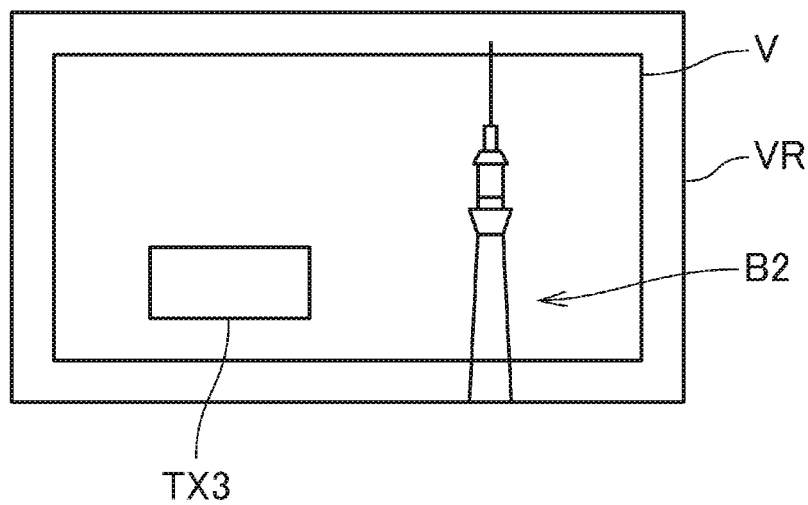

The display example illustrated in FIG. 14 is an example in which the control section 450 of each of the HMDs 1B and 1C reproduces the content data 445 on the basis of the output information 447.

In the display example illustrated in FIG. 14(a), an avatar image A2 is displayed to overlap the external scenery B in the display region V. The display example illustrated in FIG. 14(b) illustrates a state in which the display illustrated in FIG. 14(a) transitions, and guidance information TX3 is displayed. The avatar image A2 and the guidance information TX3 are included in the content for tourist information included in the content data 445, and the display of the avatar image A2 is changed to display of text of the guidance information TX3 with the passage of time. Designation of the content and determination of a display position are the same as described with reference to FIG. 13.

Figure 15:
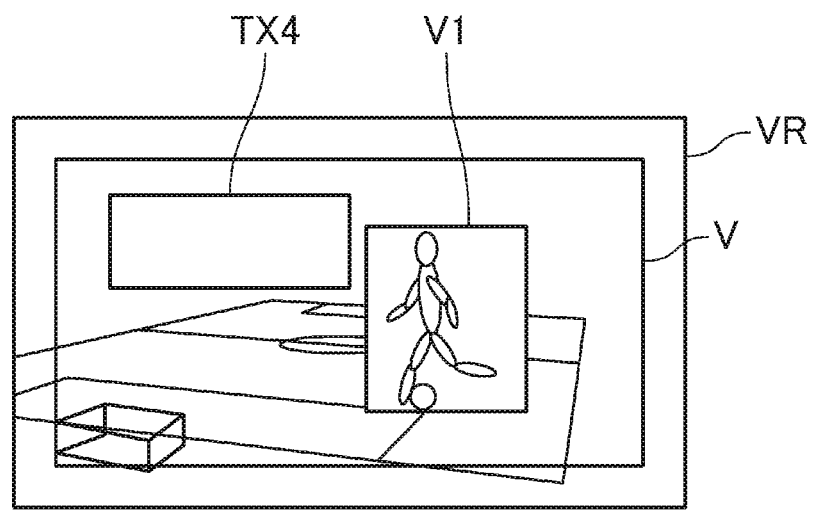
FIG. 15 is a diagram for explaining an operation and a display example in the HMD.

FIG. 15 illustrates still another display example in the HMDs 1B and 1C.

The display example illustrated in FIG. 15 is an example in which the control section 450 of each of the HMDs 1B and 1C reproduces the content data 445 on the basis of the output information 447. An enlarged image V1 and guidance information TX4 are displayed to overlap the external scenery B in the display region V.

The enlarged image V1 is obtained by enlarging an image extracted from a captured image in the camera 61 of the HMD 1A or an image extracted from a captured image in the camera 61 of each of the HMDs 1B and 1C. The guidance information TX4 is included in the content data 445. Text of the guidance information TX4 is updated according to the content of the enlarged image V1 with the passage of time.

As illustrated in FIG. 15, in a case of watching a soccer game or the like, the users U2 and U3 are separated from the field, and thus may not be able to visually recognize details thereof, but, in this case, can watch the soccer game with a presence feeling by displaying the enlarged image V1. The enlarged image V1 may be an image delivered from an external device. The guidance information TX4 may be an image delivered from an external device. In this example, an enlarged target position suitable for a position and a direction of a visual field of each of the HMDs 1B and 1C are designated through an operation of the user U1 using the HMD 1A, and information for designating the enlarged target position is included in output information. In this case, output information transmitted to the HMD 1B from the HMD 1A may be different from output information transmitted to the HMD 1C from the HMD 1A. Each of the HMDs 1B and 1C displays a captured image in the camera 61, or acquires the enlarged image V1 from an external device and displays the enlarged image V1, on the basis of the output information. Consequently, the content appropriate for the users U2 and U3 can be reproduced even in a case where the users U2 and U3 do not have knowledge of an area viewed as the external scenery B.

Figure 16:
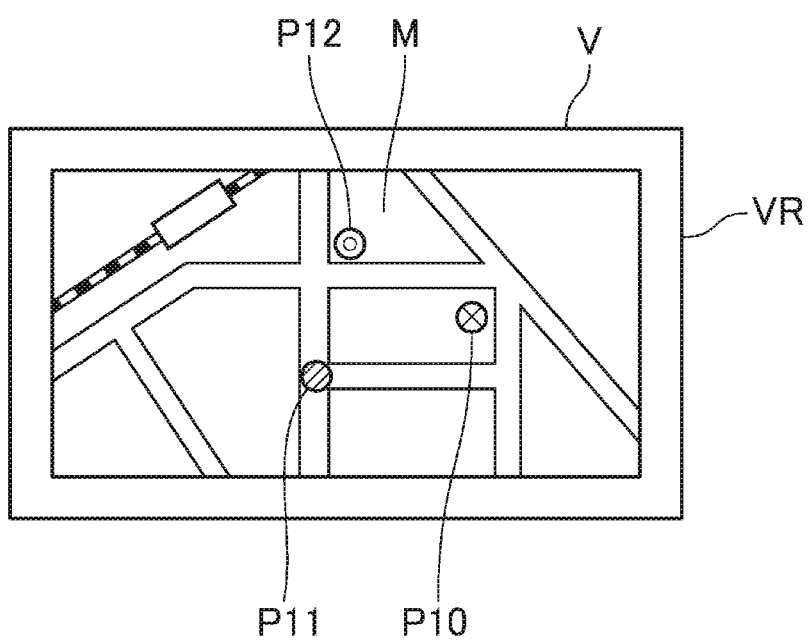
FIG. 16 is a diagram for explaining an operation and a display example in the HMD.

FIG. 16 illustrates still another display example in the HMDs 1B and 1C.

The display example illustrated in FIG. 16 is an example in which the control section 450 of each of the HMDs 1B and 1C displays a map on the basis of the output information 447.

In the display example illustrated in FIG. 16, a map is displayed in the display region V, and a symbol P10 indicating a position of the HMD 1A, a symbol P11 indicating a position of the HMD 1B, and a symbol P12 indicating a position of the HMD 1C are disposed on the map.

All of the HMDs 1A, 1B and 1C can be displayed on the map illustrated in FIG. 16, and the HMDs 1B and 1C are displayed on the basis of output information transmitted from the HMD 1A. In this case, the output information includes information indicating positions of the HMDs 1A, 1B and 1C as, for example, coordinates measured by a GPS. The control section 150 generates or acquires an image of a map centering on the position of the HMD 1A, or extracts the image from the content data 145 stored in the storage section 140. The control section 450 of the HMD 1B generates or acquires an image of a map centering on the position of the HMD 1B, or extracts the image from the content data 445 stored in the storage section 440. This is also the same for the HMD 1C. Consequently, each of the HMDs 1A, 1B and 1C can display a map according to a position of the user U.

As described above, the guidance system 100 of the present embodiment is a display system including the HMD 1A, and the HMDs 1B and 1C. The HMD 1A includes the image display section 20 A which displays an image to be visually recognized in an overlapping manner with external scenery, the operation detection unit 157 which receives an instruction, and the communication control unit 153 which performs communication with the HMDs 1B and 1C. The HMD 1A includes the control section 150 which generates output information in response to the instruction received by the operation detection unit 157, and transmits the output information to the HMDs 1B and 1C by using the communication control unit 153. The HMDs 1B and 1C include the image display sections 20B and 20C which display an image to be visually recognized in an overlapping manner with external scenery, and the communication control unit 453 which performs communication with the HMD 1A. The HMDs 1B and 1C include the storage section 440 which stores AR content including an AR image combined with external scenery visually recognized in the image display sections 20B and 20C. The HMDs 1B and 1C include the control section 450 which displays an image based on at least one of the AR content stored in the storage section 440 and the output information received by the communication control unit 453 on the image display sections 20B and 20C according to positions of the HMDs 1B and 1C or visual fields of external scenery visually recognized through the image display sections 20B and 20C. Consequently, when the AR content is displayed in the HMDs 1B and 1C, an image can be displayed in accordance with positions or visual fields of the HMDs 1B and 1C on the basis of an instruction received by the HMD 1A. Thus, in the AR content visually recognized by the users U2 and U3 of the HMDs 1B and 1C, a designated position can be shown so as to be appropriately correlated with external scenery of a real space and to reflect the intention of the user U1 using the HMD 1A.

The control section 150 of the HMD 1A may generate output information including at least one of an image and a voice, and may transmit the output information to the HMDs 1B and 1C by using the communication control unit 153. In this case, the control section 450 of the HMDs 1B and 1C may be configured to perform an operation of displaying the AR content stored in the storage section 440 on the image display sections 20B and 20C at a timing corresponding to output of the voice included in the output information. Alternatively, the control section 450 may be configured to perform an operation of displaying the AR content stored in the storage section 440 on the image display sections 20B and 20C along with the image included in the output information received by the communication control unit 453. According to this configuration, an image regarding a designated position received by the HMD 1A can be displayed in the HMDs 1B and 1C.

The control section 150 of the HMD 1A may be configured to generate a map (for example, the position display image S1 or the map illustrated in FIG. 16) indicating positions of the HMDs 1B and 1C and display the map on the image display section 20A. According to this configuration, the user U1 of the HMD 1A can promptly recognize positions of the HMDs 1B and 1C.

The control section 150 of the HMD 1A may be configured to transmit output information including an image of the map indicating positions of the HMDs 1B and 1C to the HMDs 1B and 1C by using the communication control unit 153. According to this configuration, it is possible to notify the users U2 and U3 of the HMDs 1B and 1C of the positions of the HMDs 1B and 1C.

The control section 150 of the HMD 1A may generate output information including a designated position in a position designation operation received by the operation detection unit 157. In this case, the control section 450 of the HMDs 1B and 1C may be configured to display the AR content stored in the storage section 440 on the image display sections 20B and 20C along with an image of a pointer indicating the designated position included in the output information. According to this configuration, the designated position for the HMD 1A can be shown to the users U2 and U3 of the HMDs 1B and 1C by using the pointer image.

The control section 150 of the HMD 1A may be configured to generate output information including an image drawn through a position designation operation received by the operation detection unit 157. According to this configuration, the image drawn through an operation on the HMD 1A can be shown to the users U2 and U3 of the HMDs 1B and 1C.

The HMD 1A includes the voice input/output control unit 161 which collects and outputs voices. The control section 150 may generate output information including voices collected by the voice input/output control unit 161, or voices obtained by translating words recognized from the voices collected by the voice input/output control unit 161. In this case, the HMDs 1B and 1C include the voice input/output control unit 461 which collects and outputs voices. The control section 450 may be configured to output the voices included in the output information received by the communication control unit 453 by using the voice input/output control unit 461. According to this configuration, voices can be delivered from the HMD 1A to the HMDs 1B and 1C, and the voices can also be translated. Consequently, communication using voices can be performed between the user U1 of the HMD 1A and the users U2 and U3 of the HMDs 1B and 1C.

Each of the image display sections 20B and 20C may display images respectively visually recognized with the right eye and the left eye of each of the users U2 and U3 at a set convergence angle. In this case, the control section 450 may be configured to set convergence angles in the image display sections 20B and 20C on the basis of setting data included in output information received by the communication control unit 453. According to this configuration, convergence angles at which images on the image display sections 20B and 20C are visually recognized by the users U2 and U3 of the HMDs 1B and 1C can be set on the basis of output information from the HMD 1A. Thus, it is possible to adjust distances at which the users U2 and U3 of the HMDs 1B and 1C visually recognize images.

The control section 450 may be configured to perform setting related to the image display sections 20B and 20C on the basis of setting data included in output information received by the communication control unit 453. According to this configuration, it is possible to set images on the image display sections 20B and 20C visually recognized by the users U2 and U3 of the HMDs 1B and 1C by using the HMD 1A.

The AR content stored in the storage section 440 may be configured to include an image of an avatar performing guidance for the users U2 and U3. According to this configuration, the users U2 and U3 of the HMDs 1B and 1C can be guided by using the avatar images displayed on the image display sections 20B and 20C.

The control section 450 may display images for an operation tab on the image display sections 20B and 20C. In this case, the control section 450 may be configured to change display on the image display sections 20B and 20C according to an operation on the tab. According to this configuration, the users U2 and U3 of the HMDs 1B and 1C can perform an operation on the tab.

The guidance system 100 includes a plurality of HMDs 1B and 1C correlated with the HMD 1A. The HMD 1A simultaneously transmits output information to the HMDs 1B and 1C. The HMDs 1B and 1C displays the AR content designated by the output information in synchronization with a timing controlled by the HMD 1A. Thus, a plurality of HMDs 1B and 1C forming the guidance system 100 can synchronously display the AR content under the control of the HMD 1A which is a master.

The invention is not limited to the configuration of the above-described embodiment, and can be realized in various aspects within the scope without departing from the spirit thereof.

For example, in the above-described embodiment, a configuration in which the user U visually recognizes external scenery through the display section is not limited to a configuration in which external light is transmitted through the right light guide plate 26 and the left light guide plate 28. For example, the invention is applicable to a display apparatus which displays images in a state in which external scenery cannot be visually recognized. Specifically, the invention is applicable to a display apparatus which displays a captured image in the camera 61, an image or computer graphics (CG) generated on the basis of the captured image, a video based on video data stored in advance or video data which is input from an external device, and the like. Such a display apparatus may include a so-called closed type display apparatus in which external scenery cannot be visually recognized. As described in the embodiment, the invention is applicable to a display apparatus which does not perform a process such as AR display of displaying an image overlapping a real space, mixed reality (MR) display of mixing a captured image of a real space with a virtual image, or virtual reality (VR) display of displaying a virtual image. The invention is also applicable to a display apparatus which displays video data or an analog video signal which is input from an external device.

For example, instead of the image display section 20, image display sections of other types such as an image display section worn like a cap may be used, and the image display section may include a display unit displaying an image so as to correspond to the left eye of the user U and a display unit displaying an image so as to correspond to the right eye of the user U. The display apparatus of the embodiment of the invention may be configured as a head mounted display mounted in vehicles such as an automobile or an airplane. For example, the display apparatus may be configured as a head mounted display built into a body protection tool such as a helmet. In this case, the head mounted display may be provided with a portion determining a position relative to the body of the user U, and a portion whose position is determined relative to the portion, as a mounting unit.

There may be a configuration in which the controller 10 and the image display section 20 are integrally formed, and are mounted on the head of the user U. A notebook computer, a tablet computer, a desktop computer, portable electronic devices including a game machine, a mobile phone, a smart phone, or a portable media player, and other dedicated devices may be used as the controller 10.

In the above-described embodiment, a description has been made of an exemplary configuration in which the controller 10 and the image display section 20 are separated from each other and are connected to each other via the connection cable 40, but the controller 10 and the image display section 20 may be connected to each other via a wireless communication line.

As an optical system guiding image light to the eyes of the user U, a description has been made of an exemplary configuration in which virtual images are formed on parts of the right light guide plate 26 and the left light guide plate 28 by the half mirrors 261 and 281. The invention is not limited thereto, and images may be displayed in display regions having areas occupying the whole of the right light guide plate 26 and the left light guide plate 28 or most thereof. In this case, an operation of changing a display position of an image may include a process of reducing the image.

Optical elements of the embodiment of the invention are not limited to the right light guide plate 26 and the left light guide plate 28 having the half mirrors 261 and 281, and may be optical components which cause image light to be incident to the eyes of the user U, and may be, specifically, a diffraction grating, a prism, and a holography display unit.

At least some of the respective functional blocks illustrated in the block diagrams may be realized by hardware, may be realized through cooperation between hardware and software, and are not limited to the configuration in which separate hardware resources are disposed as illustrated in the figures. A program executed by the control section 150 or 450 may be stored in the nonvolatile storage unit 121 or other storage devices (not illustrated) of the controller 10. There may be a configuration in which a program stored in an external device is acquired via the USB connector 19, the communication unit 117, or the external memory interface 186 so as to be executed. Among the constituent elements provided in the controller 10, the operation unit 170 may be used as a user interface (UI). A constituent element provided in the controller 10 may also be provided in the image display section 20. For example, the same processor as the main processor 125 may be disposed in the image display section 20, and the main processor 125 of the controller 10 and the processor of the image display section 20 may execute separate functions.

The entire disclosure of Japanese Patent Application No. 2016-241832, filed Dec. 14, 2016 is expressly incorporated by reference herein.

What is claimed is:
1. A display system comprising:
a first head-mounted display; and
a second head-mounted display,
wherein the first head-mounted display includes
a first display section that displays an image to be visually recognized in an overlapping manner with external scenery,
a reception section that receives an instruction,
a first communication section that performs communication with the second head-mounted display, and
a first control section that generates output information in response to the instruction received by the reception section, and transmits the output information to the second head-mounted display by using the first communication section, and
wherein the second head-mounted display includes
a second display section that displays an image to be visually recognized in an overlapping manner with external scenery,
a second communication section that performs communication with the first head-mounted display,
a second storage section that stores AR content including an AR image combined with external scenery visually recognized in the second display section, and
a second control section that displays an image based on at least one of the AR content stored in the second storage section and the output information received by the second communication section on the second display section according to a position of the second head-mounted display or a visual field of external scenery visually recognized in the second display section,
wherein the first control section of the first head-mounted display generates the output information including a designated position in a position designation operation received by the reception section,
wherein the reception section receives the position designation operation when the first display section displays the external scenery of the first head-mounted display,
wherein the second display section displays, in the display section, information relating to the image, the information relating to the image being included within the output information, a display position of the information relating to the image being determined by the second control section,
wherein the reception section receives a pointing instruction from a user of the first head-mounted display, the pointing instruction including pointing to the image to be visually recognized,
wherein the image displayed by the second display section corresponds to the image displayed by the first display section, and
wherein the second display section further displays a pointer, a positional relationship between the image displayed by the first display section and a hand of the user of the first head-mounted display when the user points to the image displayed by the first display section being substantially the same as a positional relationship between the image displayed by the second display section and the pointer.

2. The display system according to claim 1,
wherein the first control section of the first head-mounted display generates the output information including at least one of an image and a voice, and transmits the output information to the second head-mounted display by using the first communication section, and
wherein the second control section of the second head-mounted display performs an operation of displaying the AR content stored in the second storage section on the second display section at a timing corresponding to output of a voice included in the output information, or an operation of displaying the AR content stored in the second storage section on the second display section along with an image included in the output information received by the second communication section.

3. The display system according to claim 1,
wherein the first control section of the first head-mounted display generates a map indicating a position of the second head-mounted display, and displays the map on the first display section.

4. The display system according to claim 3,
wherein the first control section of the first head-mounted display transmits the output information including an image of the map indicating the position of the second head-mounted display to the second head-mounted display by using the first communication section.

5. The display system according to claim 1,
wherein the first control section of the first head-mounted display generates the output information including an image drawn through a position designation operation received by the reception section.

6. The display system according to claim 1,
wherein the first head-mounted display further includes a first voice input/output section that collects and outputs voices,
wherein the first control section generates the output information including voices collected by the first voice input/output control section, or voices obtained by translating words recognized from the voices collected by the first voice input/output control section,
wherein the second head-mounted display further includes a second voice input/output section that collects and outputs voices, and
wherein the second control section outputs the voices included in the output information received by the second communication section via the second voice input/output section.

7. The display system according to claim 1,
wherein the second display section displays images respectively visually recognized with the right eye and the left eye of a user at a set convergence angle, and
wherein the second control section sets a convergence angle in the second display section on the basis of setting data included in the output information received by the second communication section.

8. The display system according to claim 1,
wherein the second control section performs setting related to the second display section on the basis of setting data included in the output information received by the second communication section.

9. The display system according to claim 1,
wherein the AR content stored in the second storage section includes an image of an avatar performing guidance for a user.

10. The display system according to claim 1,
wherein the second control section displays an image including an operation tab on the second display section, and changes display on the second display section according to an operation on the tab.

11. The display system according to claim 1, further comprising:
a plurality of the second head-mounted displays correlated with the head-mounted display,
wherein the first head-mounted display transmits the output information to the plurality of second head-mounted displays by using the first communication section, and
wherein the second head-mounted displays display the AR content designated by the output information in synchronization with a timing controlled by the first head-mounted display.

12. The display system according to claim 1,
wherein the second head-mounted display comprises an environment detection unit that detects brightness of the designated position, and the second control section is configured to display the image based on the AR content on the second display section according to the brightness.

13. The display system according to claim 1,
wherein the image is AR displayed as a 3D image and is either (a) moved or (b) the extent to which the image protrudes is changed, in real time by adjusting a disparity of a 3D image according to an operation of a user.

14. The display system according to claim 1, wherein the information relating to the image is text for explaining an author or origin of the image.

15. The display system according to claim 1,
wherein the second control section is configured to set convergence angles in the second display on the basis of setting data included in output information, AR content is displayed at positions corresponding to a convergence angle of the convergence angles so that visual line directions of a right eye and a left eye of the user are induced, and a plurality of second head-mounted displays have a disparity in AR content displayed in the display region so that the convergence angle is controlled.

16. The display system according to claim 1,
wherein the AR content is located at a substantially same distance as the image to be visually recognized.

* * * * *